US012774892B2

(12) United States Patent
Rebsamen et al.

(10) Patent No.: US 12,774,892 B2
(45) Date of Patent: Oct. 27, 2026

(54) VEHICLE LOCALIZATION AND MAPPING BASED ON SENSOR DATA RELIABILITY DETERMINATIONS

(71) Applicant: Zoox, Inc., Foster City, CA (US)

(72) Inventors: Brice Rebsamen, Bouc-Bel-Air (FR); Elena Stephanie Stumm, Berkeley, CA (US); Yukun Xia, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 111 days.

(21) Appl. No.: 18/658,826

(22) Filed: May 8, 2024

(65) Prior Publication Data

US 2025/0347519 A1 Nov. 13, 2025

(51) Int. Cl.
*G01C 21/28* (2006.01)
*G01C 21/00* (2006.01)
*G01S 19/39* (2010.01)

(52) U.S. Cl.
CPC ......... *G01C 21/28* (2013.01); *G01C 21/3844* (2020.08); *G01S 19/396* (2019.08)

(58) Field of Classification Search
CPC .... G01C 21/28; G01C 21/3844; G01S 19/396
USPC ............................................................ 701/25
See application file for complete search history.

(56) References Cited

U.S. PATENT DOCUMENTS 8,473,207 B2 * 6/2013 Roh ........................ G01S 19/47
701/500
11,860,287 B2 * 1/2024 Angelo ................. G01S 19/396
11,892,545 B2 * 2/2024 Zhang ...................... G01S 19/08
12,422,260 B2 * 9/2025 Shashua ............. G01C 21/1652
2007/0257837 A1 11/2007 Watanabe et al.
(Continued)

FOREIGN PATENT DOCUMENTS

JP 2021103169 A * 7/2021 ............ H04W 64/00
KR 20230140246 A * 10/2023 ............. G01S 19/20

OTHER PUBLICATIONS

Lin, Xiaohu et al. "Autonomous Vehicle Localization with Prior Visual Point Cloud Map Constraints in GNSS-Challenged Environments." Remote sensing (Basel, Switzerland) 13.3 (2021): 506. Web. (Year: 2021).*

(Continued)

*Primary Examiner* — Erin D Bishop
*Assistant Examiner* — Keith A von Volkenburg
(74) *Attorney, Agent, or Firm* — Lee & Hayes, P.C.

(57) ABSTRACT

Techniques for determining whether a global navigation satellite system (GNSS) measurement generated by a sensor associated with a vehicle is reliable. A system determines whether a first GNSS measurement generated by a first sensor and associated with a first time is reliable based on at least one of: (i) one or more GNSS measurements generated by the first sensor and associated with one or more times before and/or after the first time, or (ii) one or more GNSS measurements generated by a second sensor and associated with the first time. The system may determine whether a first GNSS measurement generated by a first sensor and associated with a first time is reliable based on whether a ratio of a sum of incremental distances associated with a GNSS measurement sequence including the first GNSS measurement over an odometry-based distance falls within a threshold range.

20 Claims, 7 Drawing Sheets

(56) References Cited

U.S. PATENT DOCUMENTS

| | | | | |
|---|---|---|---|---|
| 2014/0253371 | A1* | 9/2014 | Chen | G01S 19/34 342/357.29 |
| 2014/0288825 | A1* | 9/2014 | Czompo | G01S 19/40 701/518 |
| 2014/0375493 | A1* | 12/2014 | Weisenburger | G01S 19/47 342/357.3 |
| 2017/0010618 | A1* | 1/2017 | Shashua | B60W 60/0015 |
| 2017/0038477 | A1 | 2/2017 | Schmid | |
| 2018/0161986 | A1 | 6/2018 | Kee et al. | |
| 2019/0324150 | A1 | 10/2019 | Konschak et al. | |
| 2020/0380270 | A1* | 12/2020 | Cox | G06F 18/2413 |
| 2021/0215483 | A1* | 7/2021 | Krone | G01S 19/14 |
| 2022/0196849 | A1* | 6/2022 | Chen | G01S 19/51 |
| 2022/0227380 | A1* | 7/2022 | Griffith | G06T 7/246 |
| 2022/0390236 | A1* | 12/2022 | Riley | G01C 25/005 |
| 2023/0025084 | A1* | 1/2023 | Rohde | G01S 19/48 |
| 2023/0035856 | A1* | 2/2023 | Steele | G01S 19/396 |
| 2023/0043236 | A1* | 2/2023 | Zhang | G01S 19/47 |
| 2023/0258815 | A1* | 8/2023 | Ghimire | G01S 19/08 455/456.1 |
| 2024/0077884 | A1 | 3/2024 | Schmitt et al. | |

OTHER PUBLICATIONS

Hu, Huawei et al. "Kilometer Sign Positioning Aided INS/ Odometer Integration for Land Vehicle Autonomous Navigation." IEEE sensors journal 23.4 (2023): 1-1. Web. (Year: 2023).*

Taylor, George, et al. "GPS accuracy estimation using map matching techniques: Applied to vehicle positioning and odometer calibration." Computers, environment and urban systems 30.6 (2006): 757-772. (Year: 2006).*

Search Report and Written Opinion for International Application No. PCT/US2025/028098, Dated Sep. 1, 2025, 12 pages.

* cited by examiner

110

| TIME | FIRST SENSOR MEASUREMENT | SECOND SENSOR MEASUREMENT |
|---|---|---|
| $T_A$ | -2702738.1066, 4279910.9613, 3867482.3854 (110A) | -2702737.0659, 4279911.7531, 3867483.1772 |
| $T_B$ | -2702740.4502, 4279906.5766, 3867485.6478 (110B) | -2702739.1710, -4279907.0411, 3867486.0241 (110E) |
| $T_C$ | -2702741.9778, 4279903.3288, 3867488.1575 (110C) | -2702740.6062, 4279903.5880, 3867488.8246 |
| $T_D$ | -2702745.0170, 4279898.5172, 3867491.3367 (110D) | -2702744.0699, 4279898.5662, 3867491.9403 |

| PAIR | INCREMENTAL DISTANCE |
|---|---|
| $T_A$-$T_B$ | 5.907841298 METERS (112A) |
| $T_B$-$T_C$ | 4.379538868 METERS (112B) |
| $T_C$-$T_D$ | 6.518860625 METERS (112C) |

| | |
|---|---|
| INCREMENTAL DISTANCE SUM | 12.42670192 METERS (114) |

| | | REJECTED? |
|---|---|---|
| ODOMETRY RATIO | 0.875119854 (116) | NO |

| TIME | CROSS-SENSOR DEVIATION | REJECTED? |
|---|---|---|
| $T_A$ | 1.528708923 METERS | NO |
| $T_B$ | 1.412318866 METERS | NO |
| $T_C$ | 1.547091985 METERS | NO |
| $T_D$ | 1.124158516 METERS | NO |

118

VEHICLE LOCALIZATION AND MAPPING BASED ON SENSOR DATA RELIABILITY DETERMINATIONS

BACKGROUND

Reliable localization and mapping is crucial for autonomous vehicles and/or fleet management systems. For example, autonomous vehicles may rely on large amounts of environmental and map data to assist with navigation. However, errors, noise, and/or imprecision in sensor data may complicate effective performance of localization and/or mapping tasks.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
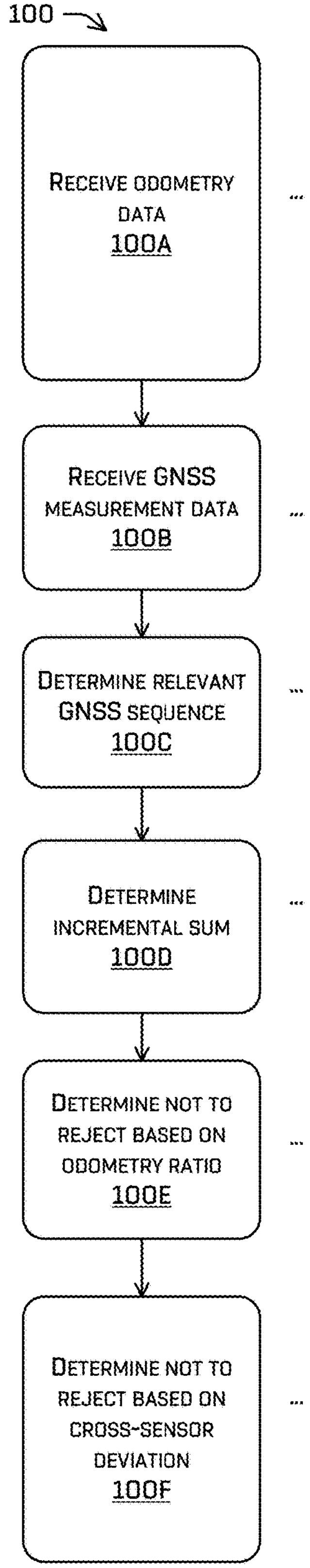
FIG. 1 is a flowchart diagram of an example process for determining to accept (or refrain from rejecting) the reliability of a GNSS measurement.
Figure 1:
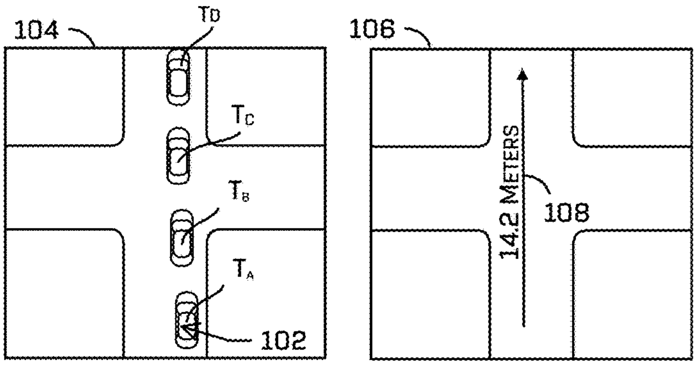

This disclosure describes techniques for determining whether a global navigation satellite system (GNSS) measurement generated by a sensor associated with a vehicle is reliable. In some cases, an example system determines whether a first GNSS measurement generated by a first sensor and associated with a first time is reliable based on at least one of: (i) one or more GNSS measurements generated by the first sensor and associated with one or more times before and/or after the first time, or (ii) one or more GNSS measurements generated by a second sensor and associated with the first time. For example, in some cases, the system may determine whether a first GNSS measurement generated by a first sensor and associated with a first time is reliable based on at least one of: (i) whether a ratio of a sum of incremental distances associated with a GNSS measurement sequence including the first GNSS measurement over an odometry-based distance falls within a threshold range, or (ii) whether a distance between the first GNSS measurement and a second GNSS measurement captured by a second sensor and associated with the first time falls below a threshold.

In some cases, as described herein, a GNSS measurement is determined to be associated with a time Tif the GNSS measurement is associated with a timestamp M that is within a threshold period of T (e.g., if $|T-M|\leq P$, where P may be the threshold period). The threshold period may be determined based on a predefined value, such as a predefined value of zero seconds, one second, five seconds, ten seconds, and/or the like. In some cases, the threshold period may be determined (e.g., dynamically determined) based on one or more GNSS sensor specifications, GNSS sensor signal strength, vehicle speed, GNSS sensor throughput, and/or the like.

In some cases, given a Tth GNSS measurement related to a time T, the system determines a sequence of S GNSS measurements including the Tth GNSS measurement. For example, the sequence may include $S_1$ GNSS measurements associated with $S_1$ time(s) before T and $S_2$ GNSS measurements associated with $S_2$ time(s) after T (e.g., such that $S_1+S_2+1=S$). The system may then determine a sum of incremental distances between the sequence of S GNSS measurements. For example, the system may determine the incremental distance sum associated with the S GNSS measurements based on $$\sum_{i=1}^{S-1} d(i, i+1),$$

where d(a,b) may represent a measure of distance (e.g., a Euclidean distance) between an ath GNSS measurement in the sequence and a bth GNSS measurement in the sequence. In some cases, if the ath GNSS measurement is associated with the three-dimensional value (e.g., the Earth-centered, Earth-fixed (ECEF) coordinate value) $(x_1, y_1, z_1)$ and the bth GNSS measurement is associated with the three-dimensional value $(x_2, y_2, z_2)$, the system may determine d(a,b) based on $\sqrt[2]{(x_1-x_2)^2+(y_1-y_2)^2+(z_1-z_2)^2}$.

In some cases, after determining the incremental distance sum associated with the sequence of S GNSS measurements that includes the Tth GNSS measurement, the system determines an odometry-based ratio associated with that GNSS measurement sequence. The odometry-based ratio may represent a ratio of the incremental distance sum associated with the GNSS measurement sequence and an odometry-based distance associated with the GNSS measurement sequence. The odometry-based distance may represent a vehicle's estimated travel distance as determined based on measurement(s) associated with one or more odometry sensors (e.g., sensors that measure rotations of a vehicle gear, wheel, and/or the like) and associated with a time period corresponding to the GNSS measurement sequence. For example, the odometry-based distance can represent a vehicle's estimated travel distance during a time period that includes all of the times between the time $T-S_1$ and the time $T+S_2$, as described above. In some cases, the system determines the odometry-based ratio associated with the sequence of S GNSS measurements based on $$\frac{\sum_{i=1}^{S-1} d(i, i+1)}{o(T-S_1, T+S_2)},$$

where o(e,f) may represent the odometry-based distance related to a time period that includes all of the times between a time e and a time f. In some cases, after determining the odometry-based ratio associated with the sequence of S GNSS measurements that includes the Tth GNSS measurement, the system determines whether the Tth GNSS measurement is reliable based on whether the odometry-based distance falls within a threshold range (e.g., within the range [1−A, 1+B], where A and B may be predefined and/or predetermined values, or where A and/or B may be dynamically determined, such as based on one or more localization signals and/or based on the vehicle speed).

In some cases, given a GNSS measurement $T_1$ that is generated by a first sensor and associated with a time T, the system detects a GNSS measurement $T_2$ that is generated by a second sensor and associated with the time T. In some cases, the system determines a cross-sensor distance associated with $T_1$ based on a measure of distance (e.g., a Euclidean distance) between $T_1$ and $T_2$. In some cases, if $T_1$ is associated with the three-dimensional value (e.g., the ECEF coordinate value) $(x_3, y_3, z_3)$ and $T_2$ is associated with the three-dimensional value $(x_4, y_4, z_4)$, the system may determine the cross-sensor distance associated with $T_1$ based on $\sqrt[2]{(x_3-x_4)^2+(y_3-y_4)^2+(z_3-z_4)^2}$. In some cases, after determining the cross-sensor distance associated with $T_1$, the system determines whether $T_1$ is reliable based on whether the determined cross-sensor distance falls below a threshold.

In some cases, the techniques described herein include receiving a GNSS measurement. A GNSS measurement may be any measure of geographic position and/or any geolocation measure. A GNSS measurement may be generated by a GNSS sensor, such as based on signals received from one or more GNSS satellites. Examples of GNSS measurements include GPS measurements, GLONASS measurements, Galileo™ measurements, and BeiDou™ measurements. A GNSS measurement may represent at least one of a latitude-longitude coordinate (e.g., a latitude-longitude-altitude coordinate), an ECEF coordinate, or a Universal Traverse Mercator (UTM) coordinate. Examples of latitude-longitude coordinates include decimal degree (dd) coordinates, degrees-minutes-seconds (DMS) coordinates, and degrees-decimal minutes (DDM) coordinates. In some cases, a GNSS measurement is associated with a respective time. As described above, in some cases, a GNSS measurement may be determined to be associated with a respective time if the GNSS measurement is associated with a timestamp that occurs within a threshold period of the respective time.

In some cases, the techniques described herein include determining a movement pattern associated with a GNSS measurement sequence. A movement pattern may include data representing one or more features of a detected movement, such as an estimated travel distance of a detected movement. A GNSS measurement sequence may represent GNSS measurements generated by and/or reported by a particular sensor over time. For example, a GNSS measurement sequence may include a first GNSS measurement generated by a first sensor and associated with a first time and a second GNSS measurement generated by the same first sensor and associated with a second time. The movement pattern may represent an estimated travel distance as determined based on the GNSS measurement sequence (e.g., based on a distance between the first and the second GNSS measurements).

In some cases, the movement pattern associated with a GNSS measurement sequence may be determined based on an incremental distance sum associated with the GNSS measurement sequence. The incremental distance sum may be a sum of a set of incremental distance measures, where an incremental distance measure may be a measure of distance (e.g., Euclidean distance) between two consecutive GNSS measurements in the sequence. For example, in some cases, the incremental distance sum associated with a sequence of S GNSS measurements represents a sum of S−1 incremental distance measures associated with the sequence. An incremental distance measure may represent a measure of distance (e.g., a Euclidean distance) between two consecutive GNSS measurements in the sequence. For example, given a sequence of S=4 GNSS measurements {M1→M2→M3→M4}, this sequence may be associated with S−1=4−1=3 incremental distance measures, including: (i) a first incremental distance measure representing a distance between M1 and M2, (ii) a second incremental distance measure representing a distance between M2 and M3, and (iii) a third incremental distance measure representing a distance between M3 and M4. In this example, the incremental distance sum associated with the sequence may represent a sum of the first, the second, and the third incremental distance measures.

In some cases, the techniques described herein include determining a movement pattern based on odometry data associated with a vehicle. Odometry data associated with a vehicle may represent one or more properties associated with one or more detected movements (e.g., linear displacement motion(s), rotation(s), acceleration(s), and/or the like) associated with the vehicle. The movement pattern determined based on odometry data may represent an estimated travel distance of the vehicle over a time period.

In some cases, the odometry data is generated by one or more odometry sensors associated with the vehicle. Examples of odometry sensors include wheel sensors (e.g., rotational encoders), steering angle sensors, wheel angle sensors, inertial measurement units (IMUs), gyroscopes, and accelerometers. For example, odometry data generated by a wheel sensor may be used to determine the linear displacement of a vehicle, for example based on the number of wheel rotations and/or the wheel circumference (e.g., by multiplying the number of wheel rotations and the wheel circumference over a time period). As another example, odometry data generated by a steering angle sensor and/or a wheel angle sensor may be used to determine the vehicle's heading. As another example, odometry data generated by an IMU may be used to determine the vehicle's linear acceleration, linear displacement, and/or angular velocity. In some cases, the techniques described herein include combining odometry data from two or more sensors (e.g., using one or more sensor fusion techniques such as a Kalman filter technique) to determine a movement pattern based on the vehicle's odometry data.

In some cases, a movement pattern determined based on odometry data represents an estimated travel distance of a vehicle during a time period, as determined based on odometry data associated with that time period. For example, the movement pattern may represent an estimated travel distance between a first time and a second time. The estimated travel distance may, for example, be determined by combining data about magnitude and direction of movement of the vehicle between the first and the second time.

In some cases, the techniques described herein include determining whether a first GNSS measurement is reliable based on: (i) a movement pattern associated with a GNSS measurement sequence that includes the first GNSS measurement, and (ii) a movement pattern determined based on the odometry data. For example, a system may determine whether a first GNSS measurement that is associated with a first time is reliable based on (e.g., based on a ratio of): (i) a movement pattern (e.g., an estimated travel distance, such as an incremental distance sum as described above) associated with a sequence of GNSS measurements which includes the first GNSS measurement, a set of GNSS measurements associated with time(s) preceding the first time, and/or a set of GNSS measurements associated with time(s) after the after first time, and (ii) a movement pattern (e.g., an estimated travel distance) associated with a time period that includes the times associated with the GNSS measurement sequence, as determined based on odometry data associated with that time period. As described herein, a movement pattern may represent a feature associated with a detected movement of an object (e.g., a vehicle), for example as determined based on GNSS data and/or odometry data associated with that object.

In some cases, to determine whether a first GNSS measurement generated by a first sensor and associated with a first time is reliable, the system determines a GNSS measurement sequence that includes a defined number of GNSS measurements associated with times preceding the first time, a defined number of GNSS measurements associated with times after the first time, and the first GNSS measurement itself. For example, if the first time is T, the sequence may include all of the GNSS measurements generated and/or reported by the first sensor in association with all of the times between a time $T-S_1$ and a time $T+S_2$, where $S_1$ and $S_2$ may be predefined and/or predetermined neighborhood size parameters. In some cases, after determining the GNSS measurement sequence associated with the first GNSS measurement, the system determines a movement pattern associated with that GNSS measurement sequence. As described above, the movement pattern may include an incremental distance sum associated with the GNSS measurement sequence, such as an incremental distance sum determined based on a sum of each distance measure associated with a sequential pair of GNSS measurements in the GNSS measurement sequence.

In some cases, after determining the movement pattern associated with a GNSS measurement sequence that includes a first GNSS measurement, the system determines a movement pattern associated with a corresponding time period based on odometry data associated with that time period. In some cases, to determine the odometry-based movement, the system may determine, based on the odometry data, an estimated travel distance associated with a time period that includes all of the times associated with the GNSS measurement sequence. For example, if the GNSS measurement sequence is associated with the times between a time $T-S_1$ and a time $T+S_2$, the system may determine, based on the odometry data, an estimated travel distance for a time period that includes the period starting from the time $T-S_1$ and ending with the time $T+S_2$.

In some cases, after determining a first movement pattern associated with a GNSS measurement sequence that includes a first GNSS measurement as well as a second movement pattern associated with the GNSS measurement sequence based on odometry data, the system determines whether the first GNSS measurement is reliable based on these two movement patterns. In some cases, the system may determine whether the first GNSS measurement is reliable based on a value associated with the two movement patterns. The value may represent a deviation and/or difference associated with the two movement patterns. For example, the value may be a ratio of the two movement patterns, such as a ratio of the incremental distance sum associated with the GNSS measurement sequence and the odometry-based travel distance associated with the corresponding period. In some cases, this ratio may be one if the incremental distance sum (e.g., which may represent the GNSS-based travel distance) and the odometry-based travel distance are equal, and may diverge from one to the extent the two values differ.

In some cases, after determining a value (e.g., a ratio) based on a first and a second movement pattern associated with a first GNSS measurement, the system determines whether the GNSS measurement sequence is reliable based on whether the value falls within a threshold range (e.g., falls below a threshold, exceeds a threshold, exceeds a first threshold and falls below a second threshold, and/or the like). The threshold range may, for example, be the range [1−A, 1+B], where A and B may be predefined and/or predetermined values. In some cases, if the value falls outside the threshold range, the system determines that the first GNSS measurement is unreliable. In some cases, if the value falls within the threshold range, the system refrains from determining that the first GNSS measurement is unreliable.

For example, if a first GNSS measurement represents the coordinate (1010, 2020, 3030) and the GNSS measurement sequence that includes this first measurement includes the following sequence of coordinates {(1000, 2000, 3000)→(1001, 2002, 3003)→(1004, 2002, 3006)→(1004, 2004, 3009)} (e.g., includes one GNSS measurement preceding the first measurement and two GNSS measurements after the first measurement), then the system may determine an incremental distance sum associated with this sequence based on: (i) the distance between (1000, 2000, 3000) and (1001, 2002, 3003) (e.g., $^2\sqrt{(1010-1000)2+(2002-2000)2+(3003-3000)^2}\approx 3.74$ meters), (ii) the distance between (1001, 2002, 3003) and (1004, 2002, 3006) (e.g., (e.g., $^2\sqrt{(1004-1001)2+(2002-2002)2+(3006-3003)^2}\approx 4.24$ meters), and (iii) the distance between (1004, 2002, 3006) and (1004, 2004, 3009) (e.g., $^2\sqrt{(1004-1004)2+(2004-2002)2+(3009-3006)^2}\approx 3.61$ meters). In some cases, the system may determine that the incremental distance sum is 11.59 meters (e.g., because 3.74+4.24+3.61=11.59). In this example, if the odometry-based travel distance associated with the corresponding time period is, for example, 12.8 meters, the ratio of the incremental distance sum to the odometry-based travel distance may be determined as 11.59/12.8~0.91. If the predefined threshold range for this ratio is [0.95, 1.05], the ratio of 0.91 may fall within this range, and the system may thus refrain from determining that the first GNSS measurement is unreliable. Conversely, if the odometry-based travel distance associated with the corresponding time period is 15.2 meters, then the system may determine that the ratio of 11.59/15.2~0.76, which falls outside of the threshold range [0.95, 1.05]. As a result, the system may determine that the first GNSS measurement is unreliable. While this example describes determining the GNSS measurement sequence associated with a first GNSS measurement based on the three GNSS measurements following the first GNSS measurement, a person of ordinary skill in the relevant technology will recognize that this sequence may be defined in other ways (e.g., based on user-provided parameters). For example, in some cases, if the first time is T, the sequence may include all of the GNSS measurements generated and/or reported by the first sensor in association with all of the times between a time T−S1 and a time T+S2, where S1 and S2 may be predefined and/or predetermined neighborhood size parameters.

In some cases, the techniques described herein include determining whether a first GNSS measurement generated by a first sensor and associated with a first time is reliable based on a second GNSS measurement generated by a second sensor and associated with the same first time. For example, the two sensors may be two different GNSS sensors associated with a vehicle. In some cases, the system determines a value (e.g., a distance measure, such as a Euclidean distance measure) associated with two GNSS measurements associated with two different sensors in relation to the same time (e.g., such that the timestamp associated with the first GNSS measurement falls within a threshold period of the timestamp associated with the second GNSS measurement, and/or vice versa). In some cases, if this determined value exceeds a threshold, the system determines that the first GNSS measurement is unreliable. In some cases, if the value fails to exceed a threshold, the system refrains from determining that the first GNSS measurement is unreliable.

For example, if a first GNSS measurement is associated with the three-dimensional coordinates (1000, 2000, 3000) and the second GNSS measurement is associated with the three-dimensional coordinates (1001, 2001, 3001), the system may determine that the first GNSS measurement is associated with the value 1.732 meters (e.g., based on the Euclidean distance of the two three-dimensional coordinate sets). If the threshold value is 5.0 meters, the system may refrain from determining that the first GNSS measurement is unreliable, because 1.732 falls below 5.0. Conversely, if the second GNSS measurement is associated with the three-dimensional coordinates (1005, 2005, 3005), the system may determine the value of 8.66 meters. In this case, the system may determine that the first GNSS measurement is unreliable, because the value of 8.66 exceeds the threshold of 5.0.

Accordingly, in some cases, the system determines whether a first GNSS measurement is reliable based on whether a value (e.g., a distance) associated with the first measurement and another GNSS measurement determined by another sensor exceeds a threshold. In some cases, the threshold is determined based on at least one of: (i) a distance between the locations of the two sensors, or (ii) an expected sensor bias. The expected sensor bias may be determined based on historical data, sensor specifications, and/or environmental factors. For example, if the two GNSS sensors are mounted on a vehicle at a known distance of 2 meters from each other, and if the expected sensor bias is determined to be 0.5 meters, the threshold may be set to 2+0.5=2.5 meters. In some cases, the system may adaptively update the expected sensor bias over time based on the observed differences between the two sensors' measurements (e.g., as determined based on historical data).

In some cases, the system determines whether a first GNSS measurement is reliable based on both: (i) a first value determined based on a movement pattern associated with a GNSS measurement sequence that includes the first GNSS measurement and an odometry-based movement pattern associated with that GNSS measurement, and (ii) a second value determined based on the first GNSS measurement and a second GNSS measurement by another sensor and associated with the same time. In some cases, the system determines whether the first GNSS measurement is unreliable based on determining that either of the following tests is satisfied: (i) the first value falls outside a threshold range, or (ii) the second value exceeds a threshold. In some cases, each of those two tests addresses potential situations in which the other test may be systematically unable to detect unreliable GNSS measurements. For example, the travel distances determined based on a GNSS measurement sequence and an odometry-based distance may be accidentally similar to each other, even though the GNSS measurements are erroneous. In this case, an unreliable GNSS measurement may satisfy the first test, but may nevertheless fail the second test. As another example, two GNSS sensors may collectively report erroneous GNSS measurements. In this case, an unreliable GNSS measurement may satisfy the second test, but may nevertheless fail the first test.

In some cases, the system determines an individual reliability classification associated with a first GNSS measurement based on whether the GNSS measurement satisfies a set of defined reliability tests. For example, in some cases, the system may determine that the first GNSS measurement is associated with an unreliable classification if at least one of the following satisfied: (i) a first value determined based on a movement pattern of a GNSS measurement sequence that includes the first measurement and a corresponding odometry-based movement pattern falls outside a threshold range, or (ii) a second value determined based on the first GNSS measurement and a second GNSS measurement by another sensor and associated with the same time exceeds a threshold. As another example, in some cases, the system may determine that the first GNSS measurement is associated with a reliable classification if both of the following satisfied: (i) a first value determined based on a movement pattern of a GNSS measurement sequence that includes the first measurement and a corresponding odometry-based movement pattern falls within a threshold range, and (ii) a second value determined based on the first GNSS measurement and a second GNSS measurement by another sensor and associated with the same time fails to exceed a threshold.

Accordingly, in some cases, the system determines a set of individual reliability classifications for a set of GNSS measurements. In some cases, the system determines whether a GNSS measurement is reliable based solely on the reliability classification for that GNSS measurement. For example, in some cases, the system may determine that a GNSS measurement is reliable if the measurement is determined to be associated with a reliable classification. As another example, in some cases, the system may determine that a GNSS measurement is unreliable if the measurement is determined to be associated with an unreliable classification. In some cases, the system performs one or more operations, such as one or more morphological transformation operations, on a set of (e.g., a sequence of) individual reliability classifications to determine whether a GNSS measurement associated with one of those reliability classifications is reliable.

For example, in some cases, the system determines a sequence of individual reliability classifications associated with a sequence of GNSS measurements. Each individual reliability classification in the classification sequence may be associated with a respective one of the GNSS measurements in the measurement sequence and represent whether the respective GNSS measurement is determined to be reliable based on one or more individual reliability tests. For example, the sequence of GNSS measurements include measurements M1 to M5 that are associated with a reliable classification, measurements M6 and M7 that are associated with an unreliable classification, measurements M8 to M10 that are associated with a reliable classification, measurement M11 that is associated with an unreliable classification, and measurements M12 to M15 that are associated with a reliable classification. In this example, the sequence of GNSS measurements may be associated with the following sequence of individual reliability classifications: {1→1→1→1→1→0→0→1→1→1→0→1→1→1→1}, where a value of one represents that a corresponding GNSS measurement is associated with a reliable classification, and a value of zero designation represents that a corresponding GNSS measurement is associated with an unreliable classification.

In some cases, after determining a sequence of individual reliability classifications associated with a sequence of GNSS measurements, the system performs one or more morphological operations on the classification sequence to determine a transformed classification sequence. Examples of morphological operations include a morphological opening operation, a morphological closing operation, a morphological closing operation followed by a morphological opening operation, a morphological opening operation followed by a morphological closing operation, and a morphological erosion operation, and a morphological dilation operation. For example, the system may perform a morphological closing operation on the classification sequence {1→1→1→1→1→0→0→1→1→1→0→1→1→1→1} with a neighborhood size of three to determine the transformed classification sequence {1→1→1→1→1→1→1→1→1→1→1→1→1→1→1}.

In some cases, the system determines whether a GNSS measurement is reliable based on the corresponding transformed reliability classification associated with the GNSS measurement in the transformed classification sequence. For example, in some cases, if the corresponding transformed reliability classification associated with the GNSS measurement in the transformed classification sequence is a reliable classification, the system may determine that the GNSS measurement is reliable. As another example, in some cases, if the corresponding transformed reliability classification associated with the GNSS measurement in the transformed classification sequence is an unreliable classification, the system may determine that the GNSS measurement is unreliable.

In some cases, after determining a sequence of individual reliability classifications associated with a sequence of GNSS measurements, the system associates a GNSS measurement in the sequence to a subsequence of the classification sequence. In some cases, the system may associate a GNSS measurement to a subsequence that includes the corresponding reliability classification associated with that GNSS measurement and any neighboring classifications that have the same classification type as the corresponding reliability classification. For example, given the classification sequence {1→1→1→1→1→0→0→1→1→1→0→1→1→1→1} that is associated with a sequence of GNSS measurements from M1 to M15 respectively, the system may assign each of M1-M5 to the subsequence {1→1→1→1→1}, each of M6-M7 to the subsequence {0→0}, each of M8-10 to the subsequence {1→1→1}, M11 to the subsequence {0}, and each of M12-15 to the subsequence {1→1→1→1}. Accordingly, the system may divide the sequence of individual reliability classifications to uniform contiguous subsequence(s), and assign a determined subsequence to each GNSS measurement associated with one of the reliability classifications in the subsequence.

In some cases, after determining a reliability classification subsequence associated with a first GNSS measurement, the system may determine whether the first GNSS measurement is reliable based on whether the length of (e.g., the count of reliability classifications in) the reliability classification subsequence exceeds a threshold. In some cases, if the length exceeds the threshold, the system may determine whether the first GNSS measurement is reliable based on the reliability classification of the subsequence. For example, in some cases, if the length exceeds the threshold and the GNSS measurement(s) in the subsequence all have a reliable classification, the system may determine that the first GNSS measurement is reliable. As another example, in some cases, if the length exceeds the threshold and the GNSS measurement(s) in the subsequence all have an unreliable classification, the system may determine that the first GNSS measurement is unreliable. In some cases, if the corresponding subsequence length associated with the first GNSS measurement fails to exceed the threshold, the system may determine whether the first GNSS measurement is reliable based on one or more reliability classification subsequences that neighbor the corresponding reliability classification subsequence associated with the first GNSS measurement. For example, the system may determine whether the first GNSS measurement is reliable based on a transformed reliability classification determined using one or more morphological operations.

In some cases, after dividing a reliability classification sequence into one or more uniform and contiguous subsequences, the system determines a length associated with each of the determined subsequences. In some cases, if all of the determined subsequence lengths exceed a threshold, the system determines whether a first GNSS measurement is reliable based on the reliability classification of the corresponding subsequence. In some cases, if at least one of the determined subsequence lengths fails to exceed a threshold, the system performs one or more morphological operations on the reliability classification sequence to determine a transformed reliability classification sequence. The system may then determine whether a GNSS measurement is reliable based on the corresponding transformed reliability classification associated with the GNSS measurement in the transformed reliability classification sequence. For example, in some cases, if the corresponding transformed reliability classification associated with the GNSS measurement in the transformed classification sequence is a reliable classification, the system may determine that the GNSS measurement is reliable. As another example, in some cases, if the corresponding transformed reliability classification associated with the GNSS measurement in the transformed classification sequence is an unreliable classification, the system may determine that the GNSS measurement is unreliable.

Accordingly, in some cases, the techniques described herein enable a system to determine whether a GNSS measurement is reliable. In some cases, the system may perform the techniques described herein on a set of (e.g., a sequence of) GNSS measurements to determine whether each GNSS measurement in the sequence is reliable. In some cases, an unreliable GNSS measurement may be an erroneous, noisy, and/or overly imprecise GNSS measurement.

In some cases, the techniques described herein use GNSS measurement reliability determinations to perform one or more operations related to vehicle operation, navigation, localization, and/or mapping. For example, in some cases, the system may use GNSS measurement reliability determination(s) associated with one or more GNSS measurements to determine a map of an environment. These environment maps may then be provided to one or more computing devices that are configured to control the operations of one or more vehicles based on the environment maps. In some cases, a backend computing device may be configured to receive sensor data including GNSS measurement data associated with one or more vehicles (e.g., a fleet of vehicles). The system may then use received sensor data to generate map data that is then provided to one or more vehicle computing devices configured to operate one or more vehicles (e.g., a fleet of vehicles).

In some cases, to generate map data based on GNSS measurement data, the system may generate a factor graph based on sensor data and determine the map based on the factor graph (e.g., by performing factor graph optimization on the factor graph). An example of a factor graph is a pose graph. In some cases, to generate a map based on sensor data (e.g., GNSS measurement data) associated with one or more vehicles, the mapping system generates a factor graph such as a pose graph and uses the factor graph to generate the map. In a factor graph, a node may represent an estimated spatial property (e.g., an estimated pose, such as an estimated position and/or orientation) of a vehicle determined based on sensor data captured at one or more times. A link between two nodes may represent a known relationship and/or constraint between two spatial property estimations (e.g., associated with two moments). For example, a link may represent at least one of the following: (i) that a first spatial property estimation and a second spatial property estimation were determined based on sensor data captured during traversal of a shared trajectory (e.g., that the second estimation was captured at a moment subsequent to the moment associated with capturing the first estimation during traversal of the shared trajectory), (ii) an estimated distance and/or direction of the vehicle's travel from a location associated with the first spatial property estimation and a location associated with the second spatial property estimation during traversal of the shared trajectory (e.g., as determined based on the wheel movement data and/or steering wheel data associated with the vehicle), or (iii) a spatial relationship between the first spatial property estimation and the second spatial property estimation (e.g., a relative transformation between two estimated poses). As another example, a link may represent a physical proximity relationship between locations associated with two spatial property estimations, such as at least one of the following: (i) that the two spatial property estimations are known to be associated with a common location in the vehicle environment, or (ii) that the locations associated with the two spatial property estimations are within a threshold distance of each other. Examples of factor graphs and/or techniques for factor graph generation are described in U.S. Pat. No. 11,657,719, entitled "System for Sparsely Representing and Storing Geographic and Map data" and filed on Dec. 18, 2020, which is incorporated by reference herein in its entirety and for all purposes.

In some cases, to determine map data based on a factor graph, the system determines whether to determine a pose of a factor graph node based on whether a corresponding GNSS measurement is determined to be reliable. As described above, a factor graph node's pose may represent an estimated position and/or orientation of a vehicle in an environment location corresponding to that factor graph node. In some cases, if a GNSS measurement is determined to be reliable, the system may determine an estimated pose (e.g., an estimated position) of a factor graph node associated with the GNSS measurement based on that GNSS measurement. In some cases, if a GNSS measurement is determined to be unreliable, the system may refrain from using the GNSS measure to determine an estimated pose of the associated factor graph node (e.g., may determine the estimated pose of the associated factor graph node based on other sensor data, such as based on odometry data). Accordingly, in some cases, the techniques described herein may be used to "initialize" estimated pose data associated with nodes of a factor graph.

In some cases, the system performs factor graph optimization on a factor graph to determine map data. In some cases, factor graph optimization may be constrained by a set of weighted constraints associated with the factor graph nodes. In some cases, a constraint associated with a factor graph node may be determined based on the GNSS measurement associated with the node (e.g., based on an estimated pose represented by the GNSS measurement associated with the node). In some cases, the weight associated with this constraint may be determined based on a reliability score associated with the GNSS measurement. A reliability score associated with a GNSS measurement may be determined based on: (i) whether the GNSS measurement is determined to be reliable, (ii) a value determined based on a movement pattern associated with a GNSS measurement sequence that includes the first GNSS measurement and an odometry-based movement pattern associated with that GNSS measurement, and/or (iii) a value determined based on the first GNSS measurement and a second GNSS measurement by another sensor and associated with the same time. In some cases, if a GNSS measurement is determined to be unreliable, the corresponding constraint is given lower weight during factor graph optimization.

In some cases, the system determines an estimated location of a vehicle based on whether a GNSS measurement associated with the vehicle is reliable. These localization operations may be performed, for example, by a computing device that is configured to control a vehicle based on the vehicle's estimated location. This computing device may be an on-board vehicle computing device and/or a backend server computing device.

In some cases, to determine an estimated location of a vehicle based on whether a GNSS measurement associated with the vehicle is reliable, the system determines a vehicle's estimated location based on the GNSS measurement if the system determines that the GNSS measurement is reliable. In some cases, if the system determines that a GNSS measurement is reliable, the system uses the GNSS measurement as an input to a localization model and/or increases the weight of the GNSS measurement in the input data provided to the localization model. In some cases, if the system determines that a GNSS measurement is unreliable, the system refrains from including the GNSS measurement as an input to a localization model and/or decreases the weight of the GNSS measurement in the input data provided to the localization model.

In some cases, the techniques described herein enable improving the safety of one or more vehicles (e.g., a fleet of autonomous and/or semiautonomous vehicles). For example, in some cases, by generating more accurate factor graphs using the techniques described herein and determining maps based on those factor graphs, the mapping system may generate maps that are more reflective of the environments within which the vehicle(s) operate. These more accurate maps may then be used (e.g., by the vehicle(s)) to perform planning operations. Accordingly, by providing more accurate map data to the vehicle(s), the techniques described herein may enable controlling the vehicle(s) in a manner that is more cognizant of the environmental conditions of those vehicle(s). The result vehicle actions are therefore likely to be more cognizant of environmental conditions and compliant with safety standards. In some cases, a map determined based on a factor graph representation of an environment may be used to improve the overall safety of autonomous vehicles. For example, the map determined based on the factor graph representation may be more quickly processed by the operational systems of a vehicle, thereby improving the reaction time and operational decision-making of the vehicle.

In some cases, the techniques described herein improve the safety of a vehicle by improving localization and/or mapping operations performed by a vehicle. In some cases, the techniques described herein enable a vehicle to determine its position more precisely within the environment and/or retrieve map data associated with that environment. In some cases, more precise localization and/or mapping enables a vehicle to increase its compliance with safety-related constraints (e.g., to stay within its designated lane, maintain a safe distance from other vehicles, and/or anticipate upcoming turns and/or intersections), for example with safety-related constraints described by map data.

In some cases, the techniques described herein include the reliability of a multi-modality sensor system. For example, in some cases, the system may use the techniques described herein to determine reliable segments of GNSS measurement data. The system may then use these reliable segments to verify the accuracy of other estimated pose data reported by other sensor(s) and/or to determine estimated pose data if other pose reporting sensor(s) fail.

In some cases, the techniques described herein improve the computational efficiency of performing factor graph optimization. In some cases, the techniques described herein improve the accuracy of initial pose data and/or pose constraints associated with a factor graph. These accuracy improvements may reduce the number of operations that need to be performed before a factor graph optimization routine satisfies a threshold optimization target. Accordingly, in some cases, the techniques described improve the computational efficiency of performing factor graph optimization by reducing the number of required factor graph optimization operations.

The techniques described herein can be implemented in a number of ways. Example implementations are provided below with reference to the following figures. Although discussed in the context of an autonomous vehicle, the techniques described herein can be applied to a variety of complex systems and is not limited to autonomous vehicles. For instance, the systems, methods, and apparatuses can be used in an aviation or in a nautical context to analyze aircraft or vessel responses to simulated faults and determine whether the aircraft or vessel performed its intended operations in response to the fault.

FIG. 1 is a flowchart diagram of an example process 100 for determining to refrain from rejecting the reliability of a target GNSS measurement. As depicted in FIG. 1, at operation 100A, an example system receives odometry data associated with a time period. The odometry data may be generated by one or more odometry sensors, such as wheel movement sensor(s), wheel direction sensor(s), IMU(s), steering angle sensor(s), and/or the like.

For example, as depicted in FIG. 1, the relevant time period includes the timesteps TA, TB, Tc, and TD. As provided in the depiction 104, a vehicle 102 is moving in an environment during this time period. The time period is associated with odometry data 106, which represents that the vehicle 102 has moved in accordance with the movement pattern 108 during the relevant time period. The movement pattern 108 may be associated with an odometry-based travel distance of 14.2 meters.

At operation 100B, the system receives GNSS measurement data. The GNSS measurement data may represent one or more sequences of GNSS measurements each generated by a respective GNSS sensor of the vehicle 102.

As depicted in FIG. 1, the GNSS measurement data 110 includes GNSS measurements reported by two GNSS sensors associated with the vehicle 102. Each GNSS measurement may be associated with a time and represent a three-dimensional value, such as an ECEF value. For example, the time TA may be associated with a first GNSS measurement {−2702738.1066, 4279910.9613, 3867482.3854}, as reported by the first GNSS sensor, and a second GNSS measurement {−2702737.0659, 4279910.9613, 3867483.1772}, as reported by the second GNSS sensor. As another example, the time Tc may be associated with a first GNSS measurement {−2702741.9778, 4279903.3288, 3867488.1575}, as reported by the first GNSS sensor, and a second GNSS measurement {−2702740.6062, 4279903.5880,3867488.8246}, as reported by the second GNSS sensor.

However, while the example implementation depicted in FIG. 1 represents GNSS measurements using three-dimensional coordinate sets, a person of ordinary skill in the relevant technology will recognize that a GNSS measurement may be represented using a different format and/or a different number of dimensions. For example, in some cases, a GNSS measurement may represent at least one of a latitude-longitude coordinate (e.g., a latitude-longitude-altitude coordinate) or a UTM coordinate.

At operation 100C, the system determines a relevant GNSS measurement sequence associated with the target GNSS measurement. In some cases, the system first determines a GNSS measurement sequence associated with the target GNSS measurement. In some cases, the GNSS measurement sequence may include a set of GNSS measurements whose respective time(s) are before the time associated with the target measurement and/or a set of GNSS measurements whose respective time(s) are after the GNSS measurement. For example, the GNSS measurement sequence may include: (i) a defined number of GNSS measurements whose respective time(s) are before the time associated with the target measurement and are generated by the same sensor, and/or (ii) a defined number of GNSS measurements whose respective time(s) are after the GNSS measurement and are generated by the same sensor.

For example, as depicted in FIG. 1, the sequence of GNSS measurements associated with the GNSS measurement 110B, which is associated with the time TB, may include GNSS measurements 110A, 110C, and 110D, which are associated with the times TA, Tc, and TD respectively. This may be because the GNSS measurements 110A, 110C, and 110D are, like the GNSS measurement 110B, generated by the first GNSS sensor, as well as because the GNSS measurements 110A, 110C, and 110D occur before and after the GNSS measurement 110B. Accordingly, in the example implementation depicted in FIG. 1, the GNSS measurement sequence associated with the GNSS measurement 110B may include one GNSS measurement generated by the same GNSS sensor before the time associated with the GNSS measurement 110C, as well as two GNSS measurements generated by the same GNSS sensor after the time associated with the GNSS measurement 110C.

At operation 100D, the system determines incremental distance sum associated with the relevant GNSS measurement sequence. In some cases, the incremental distance sum is a sum of a set of incremental distance measures associated with the relevant sequence. In some cases, an incremental distance measure is a distance associated with a consecutive pair of GNSS measurements in the relevant sequence. In some cases, if the relevant sequence includes M GNSS measurements, the system determines M−1 incremental distance measures. The incremental distance sum may be the sum of the M−1 incremental distance measures.

For example, as depicted in FIG. 1, given the relevant GNSS measurement sequence including the measurements 110A-110D, the system determines the incremental distance measure 112A for the consecutive pair that includes the measurement 110A and the measurement 110B, the incremental distance measure 112B for the consecutive pair that includes the measurement 110B and the measurement 110C, and the incremental distance measure 112C for the consecutive pair that includes the measurement 110C and the measurement 110D. The system may then sum these three incremental distance measures 112A-112C to determine the incremental distance sum 114.

At operation 100E, the system determines not to reject the target GNSS measurement based on determining that an odometry-based ratio associated with the GNSS measurement sequence falls within a threshold range. The system may determine the odometry-based ratio based on a ratio of the incremental distance sum associated with the relevant GNSS measurement sequence and the odometry-based distance associated with the relevant time period.

For example, as depicted in FIG. 1, after determining the incremental distance sum 114, the system determines an odometry-based ratio 116 based on a ratio of that incremental distance sum and the odometry-based distance of 14.2, as determined based on the odometry data 106. In some cases, based on determining that this odometry-based ratio 116 falls within a threshold range, the system refrains from rejecting the target GNSS measurement 110B as unreliable.

At operation 100F, the system determines not to reject the target GNSS measurement based on a cross-sensor deviation associated with the target GNSS measurement. The cross-sensor deviation may represent a measure of distance between the target GNSS measurement and a GNSS measurement generated by another GNSS sensor with respect to the same time. In some cases, the system determines not to reject the target GNSS measurement based on determining that the cross-sensor deviation associated with the target GNSS measurement fails to exceed a threshold.

For example, as depicted in FIG. 1, the system determines that the target GNSS measurement 110B is associated with a cross-sensor deviation 118. This cross-sensor deviation may be determined based on a distance between the target GNSS measurement 110B and the GNSS measurement 110E, which is generated by the second GNSS sensor with respect to the same time TB. In some cases, after determining the cross-sensor deviation 118 associated with the target GNSS measurement 110B, the system determines not to reject the target GNSS measurement 110B based on the cross-sensor deviation 118, for example based on determining that the cross-sensor deviation 118 fails to exceed a threshold.

Figure 2:
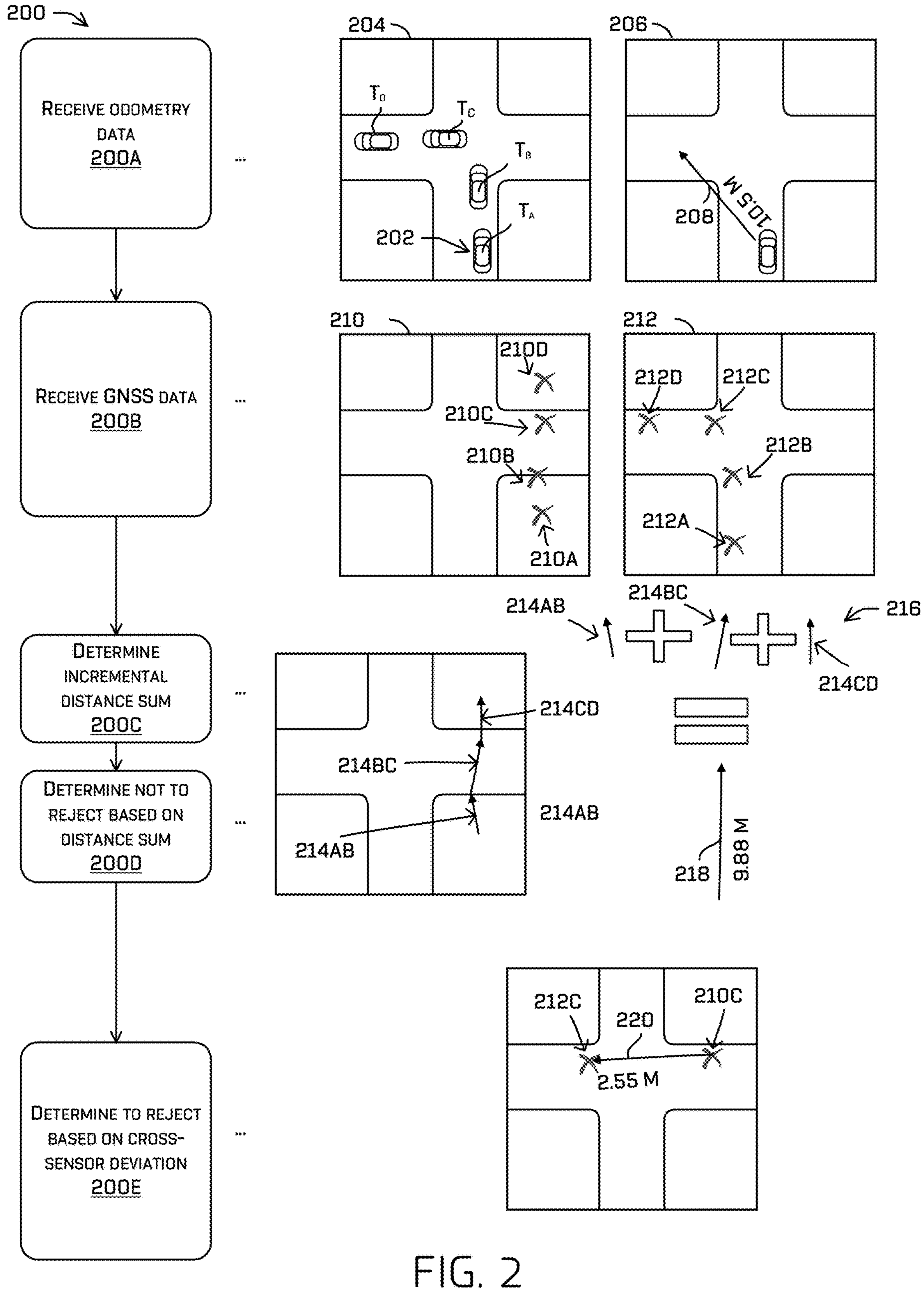
FIG. 2 is a flowchart diagram of an example process for rejecting reliability of a GNSS measurement based on a cross-sensor deviation associated with the GNSS measurement.

FIG. 2 is a flowchart diagram of an example process 200 for rejecting reliability of a target GNSS measurement based on a cross-sensor deviation associated with the target GNSS measurement. As depicted in FIG. 2, at operation 200A, an example system receives odometry data associated with a time period, for example from one or more odometry sensors.

For example, as depicted in FIG. 2, the relevant time period includes the timesteps TA, TB, Tc, and TD. As provided in the depiction 204, a vehicle 202 is moving in an environment during this time period. The time period is associated with odometry data 206, which represents that the vehicle 202 has moved in accordance with the movement pattern 208 during the relevant time period. The movement pattern 208 may be associated with an odometry-based travel distance of 10.5 meters.

At operation 200B, the system receives GNSS measurement data associated with the relevant time period. The GNSS measurement data may be generated by a set of GNSS sensors. For example, as depicted in FIG. 2, a first GNSS sensor has generated first GNSS sensor data 210 and a second GNSS sensor has generated second GNSS sensor data 212.

The first GNSS sensor data 210 includes the GNSS measurement 210A that is associated with the time TA, the GNSS measurement 210B that is associated with the time TB, the GNSS measurement 210C that is associated with the time Tc, and the GNSS measurement 210D that is associated with the time TD. Moreover, the second GNSS sensor data 212 includes the GNSS measurement 212A that is associated with the time TA, the GNSS measurement 212B that is associated with the time TB, the GNSS measurement 212C that is associated with the time Tc, and the GNSS measurement 212D that is associated with the time TD.

Accordingly, the GNSS measurements 210A and 212A may be generated by two different GNSS sensors in association with the same time. Additionally, the GNSS measurements 210B and 212B may be generated by two different GNSS sensors in association with the same time. Furthermore, the GNSS measurements 210C and 212C may be generated by two different GNSS sensors in association with the same time. Moreover, the GNSS measurements 210D and 212D may be generated by two different GNSS sensors in association with the same time.

At operation 200C, the system determines an incremental distance sum associated with the target GNSS measurement. In some cases, the system determines a GNSS measurement sequence that includes the target GNSS measurement, determines a set of incremental distance measures each associated with a consecutive pair of GNSS measurements in the sequence, and sums up those incremental distance measures to determine the incremental distance sum.

For example, as depicted in FIG. 2, the system may determine that the target GNSS measurement 210C is associated with the GNSS measurement sequence including the GNSS measurement 210A, the GNSS measurement 210B, the GNSS measurement 210C, and the GNSS measurement 210D. In some cases, after determining this GNSS measurement sequence, the system determines the incremental distance measure 214AB associated with the GNSS measurement 210A and the GNSS measurement 210B, the incremental distance measure 214BC associated with the GNSS measurement 210B and the GNSS measurement 210C, and the incremental distance measure 214CD associated with the GNSS measurement 210C and the GNSS measurement 210D. For example, the system may determine the incremental distance measure 214AB based on a Euclidean distance of the GNSS measurement 210A and the GNSS measurement 210B, the incremental distance measure 214BC based on a Euclidean distance of the GNSS measurement 210B and the GNSS measurement 210C, and the incremental distance measure 214CD based on a Euclidean distance of the GNSS measurement 210C and the GNSS measurement 210D.

As further depicted in FIG. 2, after determining the incremental distance measure 214AB, the incremental distance measure 214BC, and the incremental distance measure 214CD, the system may perform a summation operation 216. The summation operation 216 may result in determining the incremental distance sum 218 of 9.88 meters.

At operation 200D, the system determines not to reject the target GNSS measurement based on the incremental distance sum. In some cases, the system may determine not to reject the target GNSS measurement based on determining that a ratio of the incremental distance sum and an odometry-based distance falls within a threshold range. For example, in FIG. 2, the system may determine to not reject the target GNSS measurement 210C based on determining that a ratio of the incremental distance sum 218 of 9.88 meters and the odometry-based distance of 10.5 meters falls within a defined threshold range.

At operation 200E, the system determines to reject the target GNSS measurement based on a cross-sensor deviation associated with the target GNSS measurement. The cross-sensor deviation may be determined based on a distance of the target GNSS measurement and a GNSS measurement generated by another GNSS sensor in association with the same time. In some cases, the system determines to reject the target GNSS measurement based on determining that the cross-sensor deviation exceeds a threshold.

For example, as depicted in FIG. 2, the system may determine a cross-sensor deviation 220 of 2.55 meters between the target GNSS measurement 210C and the GNSS measurement 212C, which is generated by another GNSS sensor with respect to the same time Tc. In some cases, the system may determine to reject the target GNSS measurement 210C based on determining that the cross-sensor deviation 220 of 2.55 exceeds a defined threshold.

Figure 3:
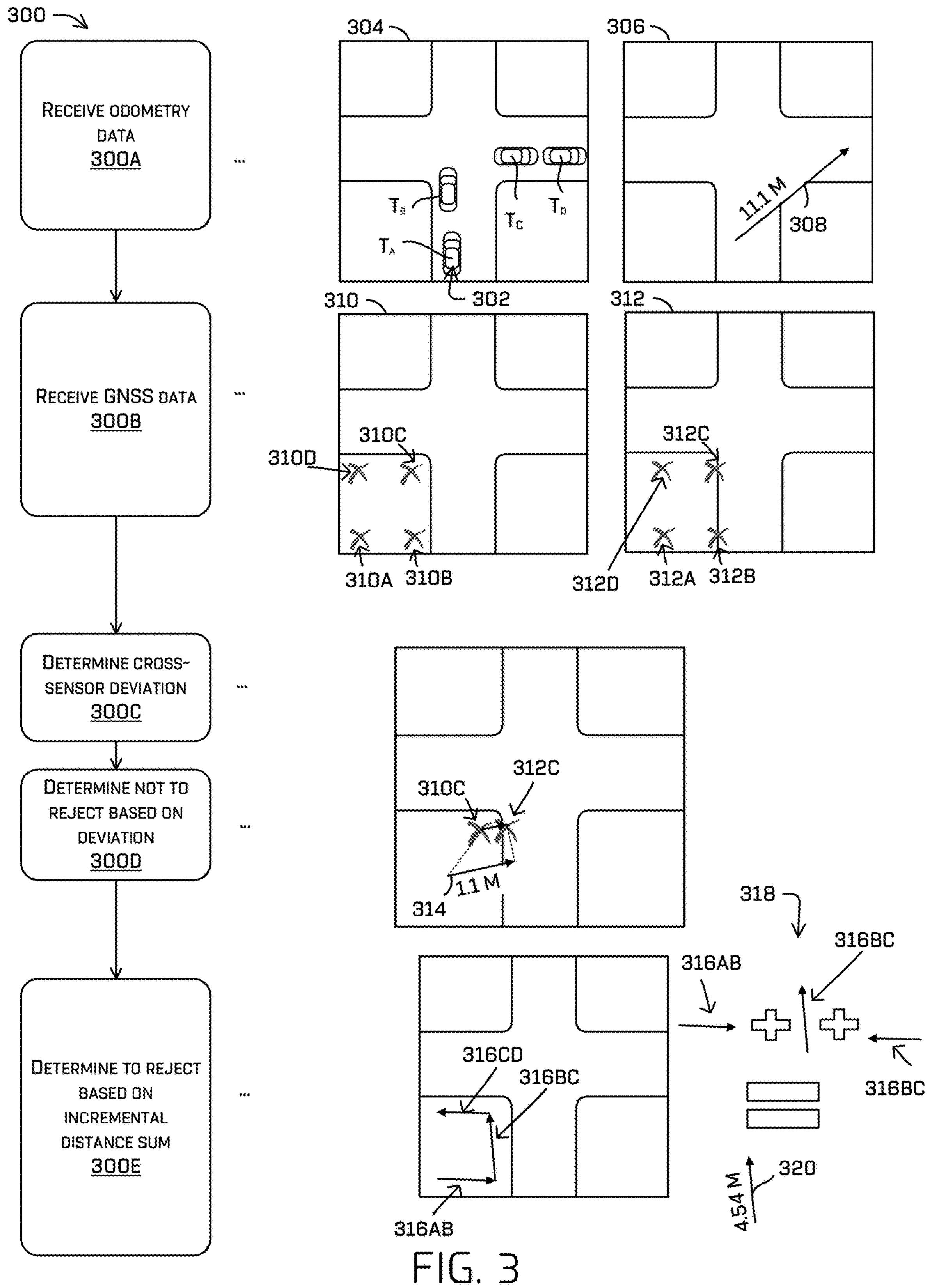
FIG. 3 is a flowchart diagram of an example process for rejecting reliability of a GNSS measurement based on an incremental distance sum associated with the GNSS measurement.

FIG. 3 is a flowchart diagram of an example process 300 for rejecting reliability of a target GNSS measurement based on an incremental distance sum associated with the target GNSS measurement. As depicted in FIG. 3, at operation 300A, an example system receives odometry data associated with a time period, for example from one or more odometry sensors.

For example, as depicted in FIG. 3, the relevant time period includes the timesteps TA, TB, Tc, and TD. As provided in the depiction 304, a vehicle 302 is moving in an environment during this time period. The time period is associated with odometry data 306, which represents that the vehicle 302 has moved in accordance with the movement pattern 308 during the relevant time period. The movement pattern 308 may be associated with an odometry-based travel distance of 10.5 meters.

At operation 300B, the system receives GNSS measurement data associated with the relevant time period. The GNSS measurement data may be generated by a set of GNSS sensors. For example, as depicted in FIG. 3, a first GNSS sensor has generated first GNSS sensor data 310 and a second GNSS sensor has generated second GNSS sensor data 312.

The first GNSS sensor data 310 includes the GNSS measurement 310A that is associated with the time TA, the GNSS measurement 310B that is associated with the time TB, the GNSS measurement 310C that is associated with the time Tc, and the GNSS measurement 310D that is associated with the time TD. Moreover, the second GNSS sensor data 312 includes the GNSS measurement 312A that is associated with the time TA, the GNSS measurement 312B that is associated with the time TB, the GNSS measurement 312C that is associated with the time Tc, and the GNSS measurement 312D that is associated with the time TD.

At operation 300C, the system determines a cross-sensor deviation associated with the target GNSS measurement. The cross-sensor deviation may be determined based on a distance of the target GNSS measurement and a GNSS measurement generated by another GNSS sensor in association with the same time. For example, as depicted in FIG. 3, the system has determined a cross-sensor deviation 314 of 1.1 meters between the target GNSS measurement 310C and the GNSS measurement 312C, which is generated by another GNSS sensor with respect to the same time Tc.

At operation 300D, the system determines not to reject the target GNSS measurement based on determining that the cross-sensor deviation fails to exceed a threshold. For example, in FIG. 3, the system may determine not to reject the target GNSS measurement 310C based on determining that the cross-sensor deviation 314 of 1.1 fails to exceed a defined threshold.

At operation 300E, the system determines to reject the target GNSS measurement based on an incremental distance sum associated with the target GNSS measurement. In some cases, the system determines a relevant GNSS measurement sequence associated with the target GNSS measurement. In some cases, the system determines incremental distance sum associated with the relevant GNSS measurement sequence. In some cases, the incremental distance sum is a sum of a set of incremental distance measures associated with the relevant sequence. In some cases, an incremental distance measure is a distance associated with a consecutive pair of GNSS measurements in the relevant sequence. In some cases, the system determines to reject the target GNSS measurement based on determining that an odometry-based ratio associated with the GNSS measurement sequence falls outside a threshold range. The system may determine the odometry-based ratio based on a ratio of the incremental distance sum associated with the relevant GNSS measurement sequence and the odometry-based distance associated with the relevant time period.

For example, as depicted in FIG. 3, the system may determine that the target GNSS measurement 310C is associated with the GNSS measurement sequence including the GNSS measurement 310A, the GNSS measurement 310B, the GNSS measurement 310C, and the GNSS measurement 310D. In some cases, the system determines the incremental distance measure 316AB associated with the GNSS measurement 310A and the GNSS measurement 310B, the incremental distance measure 316BC associated with the GNSS measurement 310B and the GNSS measurement 310C, and the incremental distance measure 316CD associated with the GNSS measurement 310C and the GNSS measurement 310D.

Figure 4:
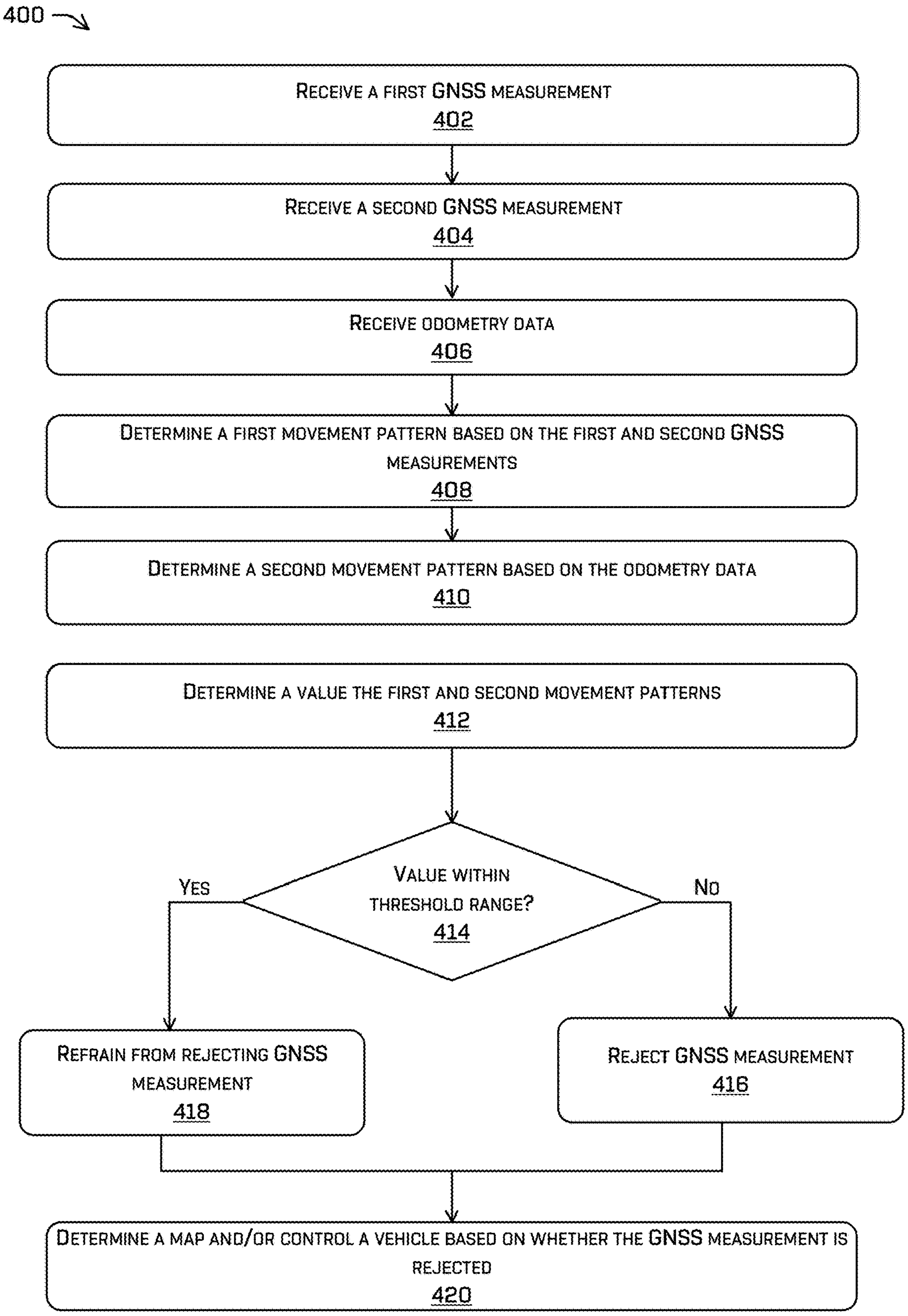
FIG. 4 is a flowchart diagram of an example process for determining whether to reject the reliability of a GNSS measurement based on a GNSS measurement associated with a different time.

Moreover, after determining the incremental distance measure 316AB, the incremental distance measure 316BC, and the incremental distance measure 316CD, the system may perform a summation operation 318. The summation operation 318 may result in determining the incremental distance sum 320 of 4.54 meters. The system may then determine to reject the target GNSS measurement 310C based on determining that a ratio of the incremental distance sum 320 of 4.54 meters and the odometry-based distance of 10.5 meters falls outside a threshold range. FIG. 4 is a flowchart diagram of an example process 400 for determining whether to reject the reliability of a first GNSS measurement based on a second GNSS measurement associated with a different time. At operation 402, an example system receives a first GNSS measurement. The first GNSS measurement may be generated by a first GNSS sensor in association with a first time.

At operation 404, the system receives a second GNSS measurement. The second GNSS measurement may be generated by the first GNSS sensor in association with a second time that may be outside a threshold period of the first time (e.g., may be before or after the first time). In some cases, the second GNSS measurement is part of a sequence of GNSS measurements that includes the first GNSS measurement.

At operation 406, the system receives odometry data. The odometry data may be associated with a time period that includes the first and the second time. For example, the odometry data may be associated with a time period corresponding to a sequence of GNSS measurements that includes the first and the second GNSS measurements.

At operation 408, the system determines a first movement pattern based on the first and the second GNSS measurements. The first movement pattern may be an estimated travel distance as determined based on the first and the second GNSS measurements (e.g., based on a sequence of GNSS measurements that includes the first and the second GNSS measurements). In some cases, the first movement pattern includes data determined based on a distance of the first and the second GNSS measurements. For example, the first movement pattern may include a sum of incremental distance measures associated with a sequence of GNSS measurements that includes the first and the second GNSS measurements.

At operation 410, the system determines a second movement pattern based on the odometry data. The second movement pattern may represent an estimated travel distance associated with a time period corresponding to the first and the second GNSS measurements, as determined based on the received odometry data. For example, the second movement pattern may represent an estimated travel distance associated with a time period corresponding to a GNSS measurement sequence that includes the first and the second GNSS measurements, as determined based on the received odometry data.

At operation 412, the system determines a value based on the first and the second movement patterns. In some cases, the system determines a ratio associated with the first and the second movement patterns. The ratio may, for example, be a ratio of an incremental distance sum and an odometry-based estimated travel distance associated with the first and the second GNSS measurements (e.g., associated with a sequence of GNSS measurements that includes the first and the second GNSS measurements).

At operation 414, the system determines whether the value falls within a threshold range. If the system determines that the value does not fall within the threshold range (operation 414—No), the system proceeds to operation 416 to reject the first GNSS measurement as unreliable. If the system determines that the value falls within the threshold range (operation 414—Yes), the system proceeds to operation 418 to refrain from rejecting the first GNSS measurement as unreliable.

At operation 420, the system determines a map and/or controls a vehicle based on whether the first GNSS measurement is rejected. In some cases, if the GNSS measurement is determined to be reliable, the system uses the GNSS measurement to determine a map of the vehicle's environment, such as using factor graph optimization. In some cases, if the GNSS measurement is determined to be reliable, the system uses the GNSS measurement to determine a vehicle's location, determine a trajectory based on the determined vehicle location, and control the vehicle based on the determined trajectory.

Figure 5:
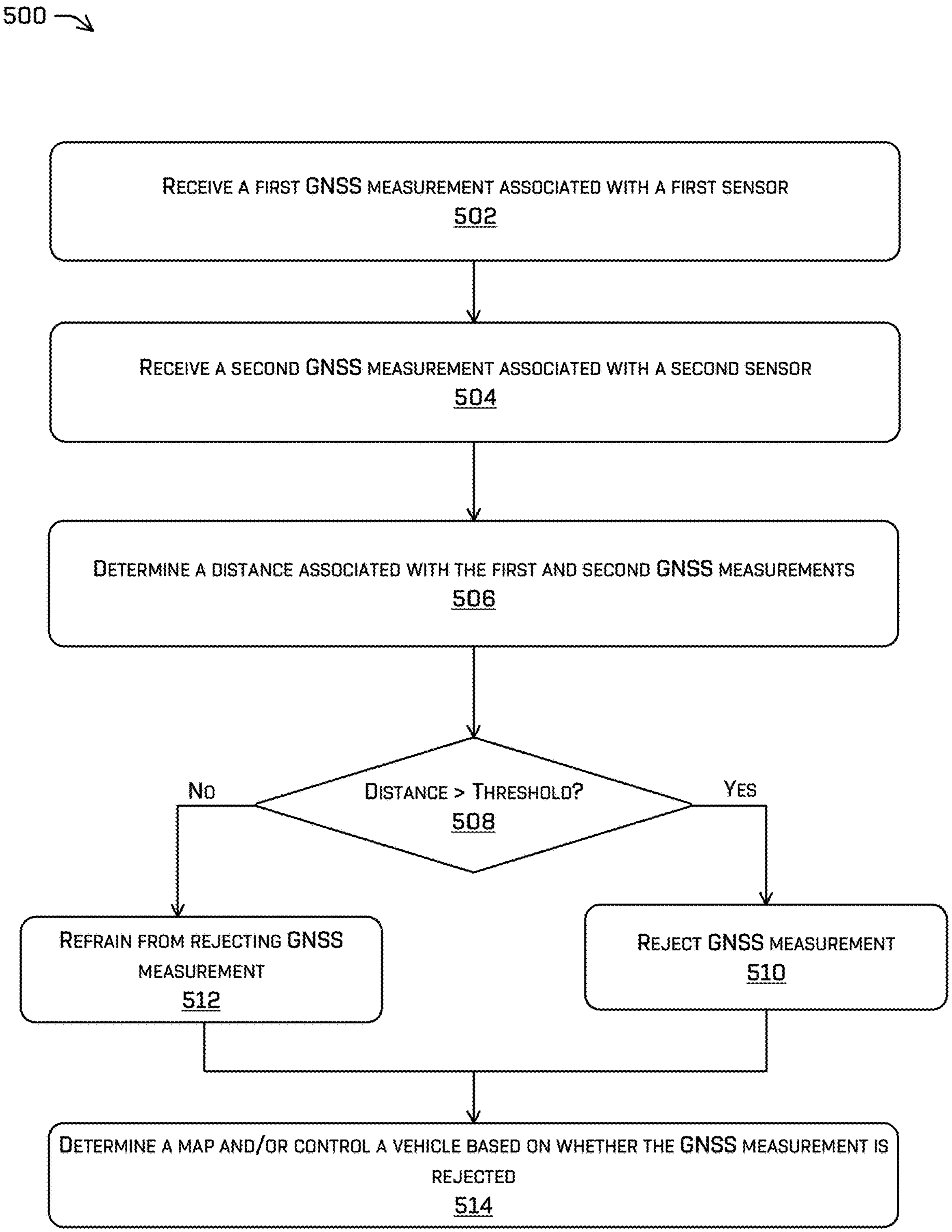
FIG. 5 is a flowchart diagram of an example process for determining whether to reject the reliability of a GNSS measurement based on a GNSS measurement generated by a different sensor.

FIG. 5 is a flowchart diagram of an example process 500 for determining whether to reject the reliability of a first GNSS measurement based on a second GNSS measurement generated by a different sensor. At operation 502, an example system receives a first GNSS measurement. The first GNSS measurement may be generated by a first GNSS sensor and in association with a first time.

At operation 504, the system receives a second GNSS measurement. The second GNSS measurement may be generated by a second, different GNSS sensor. The second GNSS measurement may be associated with the first time (e.g., may be associated with a timestamp, such as a recording and/or transmission timestamp, which is within a threshold period of first time).

At operation 506, the system determines a distance associated with the first and the second GNSS measurements. The distance may, for example, be determined based on a Euclidean distance measure associated with the two GNSS measurements.

At operation 508, the system determines whether the determined distance measure exceeds a threshold. If the system determines that the determined distance measure exceeds the threshold (operation 508—No), the system proceeds to operation 510 to reject the first GNSS measurement as unreliable. If the system the determined distance measure fails equals or falls below the threshold (operation 508—Yes), the system proceeds to operation 512 to refrain from rejecting the first GNSS measurement as unreliable.

At operation 514, the system determines a map and/or controls a vehicle based on whether the first GNSS measurement is rejected. In some cases, if the GNSS measurement is determined to be reliable, the system uses the GNSS measurement to determine a map of the vehicle's environment, such as using factor graph optimization. In some cases, if the GNSS measurement is determined to be reliable, the system uses the GNSS measurement to determine a vehicle's location, determine a trajectory based on the determined vehicle location, and control the vehicle based on the determined trajectory.

Figure 6:
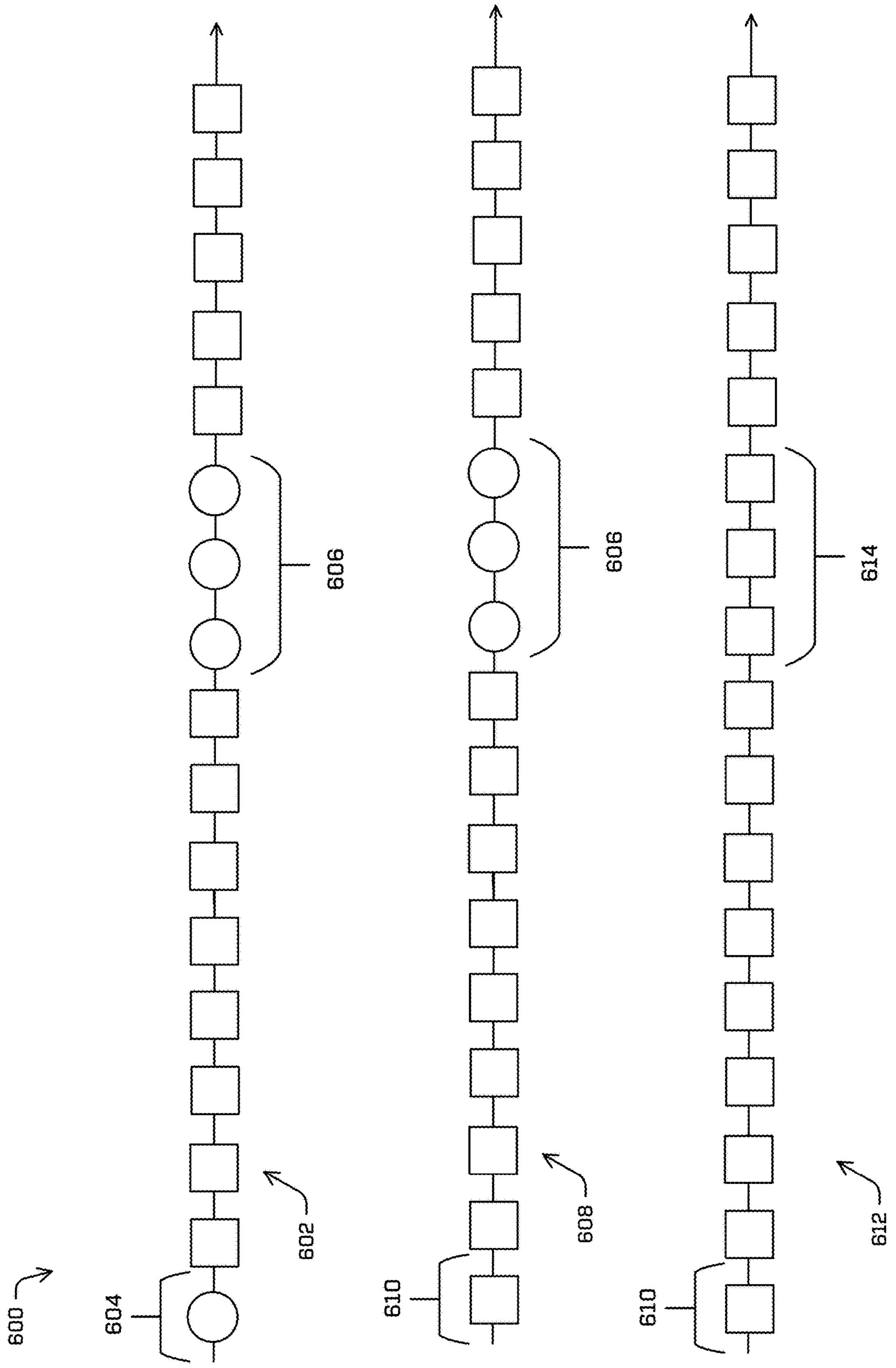
FIG. 6 provides an operational example of two sets of morphological operations.

FIG. 6 provides an operational example 600 of two sets of morphological operations. As depicted in FIG. 6, a sequence 602 of reliability classifications includes four classifications of a first classification type depicted using circle shapes and thirteen classifications of a second classification type depicted using square shapes. In some cases, the first classification type is the unreliable classification type while the second classification type is the reliable classification type. In some cases, the first classification type is the reliable classification type while the second classification type is the unreliable classification type. Accordingly, in FIG. 6, the sequence 602 includes the following two segments of classifications associated with the first classification type: segment 604, which has a size of one, and segment 606, which has a size of three.

In some cases, if the system performs a first set of morphological operations with a radius of one, the system may generate the sequence 608. As depicted in FIG. 6, in the sequence 608, the segment 604 is replaced with the segment 610 that includes one classification associated with the second classification type. However, segment 606 is maintained as a segment of three classification types associated with the first classification type.

In some cases, if the system performs a second set of morphological operations with a radius of two, the system may generate the sequence 612. As depicted in FIG. 6, in the sequence 612, in addition to segment 604 which is replaced with the segment 610, segment 606 is replaced with the segment 614, which includes three classifications with the second classification type.

Figure 7:
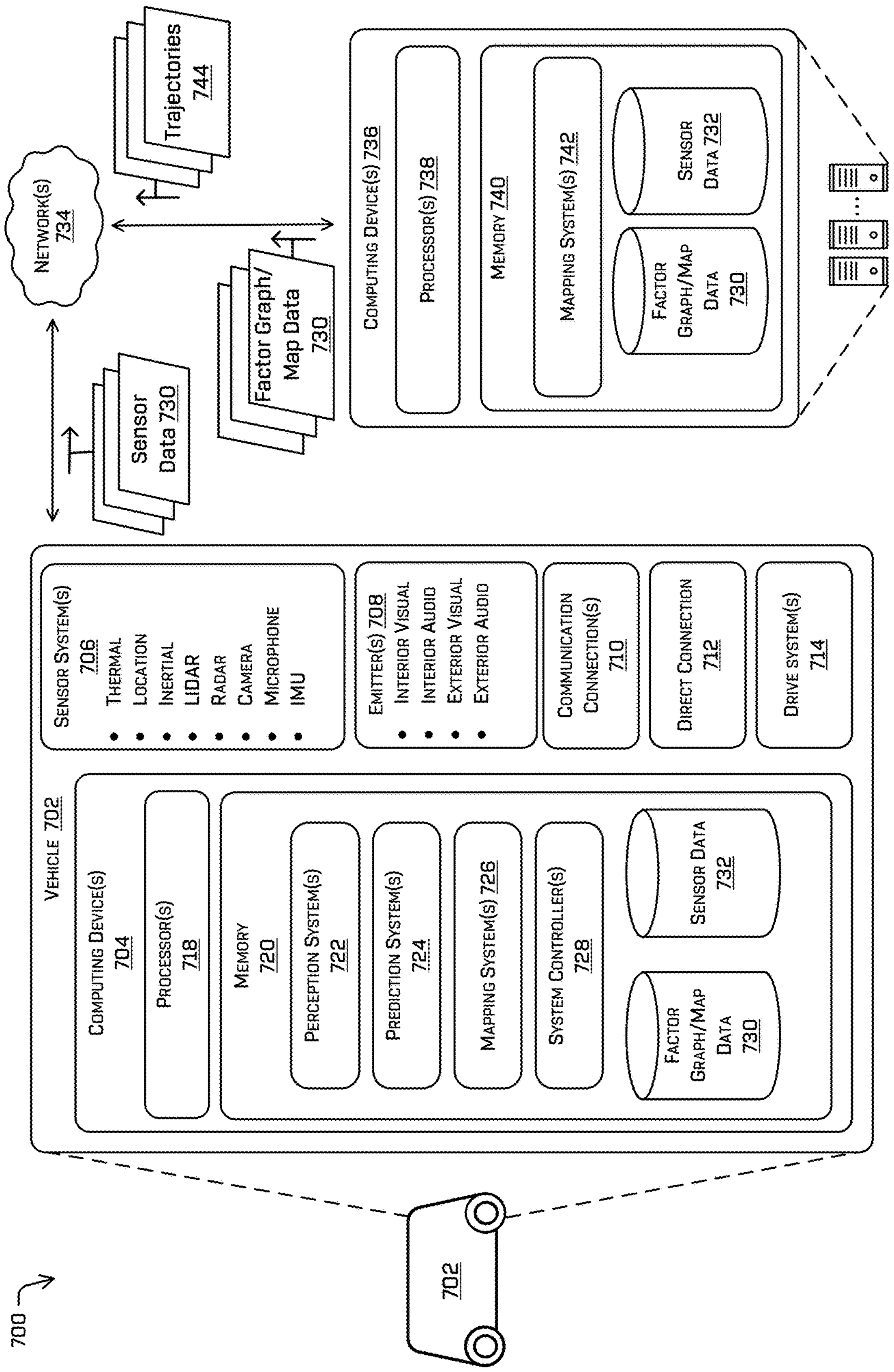
FIG. 7 depicts a block diagram of an example system for implementing the techniques discussed herein.

FIG. 7 depicts a block diagram of an example system 700 for implementing the techniques discussed herein. In at least one example, the system 700 may include a vehicle 702, such the autonomous vehicles discussed above. The vehicle 702 may include computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714. The one or more sensor system(s) 706 may be configured to capture the sensor data 732 associated with a surrounding physical environment.

In at least some examples, the sensor system(s) 706 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 706 may include multiple instances of each type of sensors. For instance, time-of-flight sensors may include individual time-of-flight sensors located at the corners, front, back, sides, and/or top of the vehicle 702. As another example, camera sensors may include multiple cameras disposed at various locations about the exterior and/or interior of the vehicle 702. In some cases, the sensor system(s) 706 may provide input to the computing device(s) 704.

The vehicle 702 may also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperations computing device) or remote services. For instance, the communication connection(s) 710 can facilitate communication with other local computing device(s) on the vehicle 702 and/or the drive system(s) 714. Also, the communication connection(s) 710 may allow the vehicle 702 to communicate with other nearby computing device(s) (e.g., other nearby vehicles, traffic signals, etc.).

The communications connection(s) 710 may include physical and/or logical interfaces for connecting the computing device(s) 704 to another computing device or one or more external network(s) 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle 702 may include one or more drive system(s) 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which may receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 may include one or more processors 718 and one or more memories 720 communicatively coupled with the processor(s) 718. In the illustrated example, the memory 720 of the computing device(s) 704 stores perception system(s) 722, prediction system(s) 724, mapping system(s) 726, as well as one or more system controller(s) 728. The memory 720 may also store data such as sensor data 732 captured or collected by the one or more sensors systems 706, factor graph/map data 730 and sensor data 732. Though depicted as residing in the memory 720 for illustrative purposes, it is contemplated that the perception system(s) 722, prediction system(s) 724, mapping system(s) 726, as well as one or more system controller(s) 728 may additionally, or alternatively, be accessible to the computing device(s) 704 (e.g., stored in a different component of vehicle 702 and/or be accessible to the vehicle 702 (e.g., stored remotely).

The perception system(s) 722 may be configured to perform object detection, segmentation, and/or classification on the sensor data 732, such as the image or lidar data. In some examples, the perception system(s) 722 may generate processed perception data from the sensor data 732. The perception data may indicate a presence of objects that are in physical proximity to the vehicle 702 and/or a classification or type of the objects (e.g., car, pedestrian, cyclist, building, tree, road surface, curb, sidewalk, unknown, etc.). In additional and/or alternative examples, the perception system(s) 722 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system(s) 724 may be configured to determine a track corresponding to an object identified by the perception system(s) 722. For example, the prediction system(s) 724 may be configured to predict a velocity, position, change in trajectory, or otherwise predict the decisions and movement of the identified objects. For example, the prediction system(s) 724 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, both of which are incorporated herein by reference in their entirety.

The mapping system 726 may be configured to generate or otherwise utilize the factor graph/map data 730. For instance, the mapping system 726 may be configured to generate trajectories for the vehicle 702 based on the factor graph/map data 730. The mapping system 726 may also be configured to update the factor graph/map data 730 based on the captured sensor data 732 as discussed above with respect to FIGS. 1-5.

In at least one example, the computing device(s) 704 may store one or more and/or system controllers 728, which may be configured to control steering, propulsion, braking, safety, emitters, communication, and other systems of the vehicle 702. The system controllers 728 may communicate with and/or control corresponding systems of the drive system(s) 714 and/or other components of the vehicle 702, which may be configured to operate in accordance with a route provided from a planning system.

In some implementations, the vehicle 702 may connect to computing device(s) 736 via the network(s) 734. For example, the computing device(s) 736 may generate and provide the factor graph/map data 730 and/or trajectories 744 to and receive the sensor data 732 from the vehicle 702. The computing device 736 may include one or more processor(s) 738 and memory 740 communicatively coupled with the one or more processor(s) 738. In at least one instance, the processor(s) 738 may be similar to the processor(s) 718 and the memory 740 may be similar to the memory 720. In the illustrated example, the memory 740 of the computing device(s) 736 stores the graph/map data 730 and the sensor data 732. The memory 740 may also store a map generation system 742 to assist with compiling and generating the factor graph/map data 730, as discussed above with respect to FIGS. 1-5.

The processor(s) 718 of the computing device(s) 704 and the processor(s) 738 of the computing device(s) 736 may be any suitable processor capable of executing instructions to process data and perform operations as described herein. By way of example and not limitation, the processor(s) 718 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 720 of the computing device(s) 704 and the memory 740 of the computing device(s) 736 are examples of non-transitory computer-readable media. The memory 720 and 740 can store an operating system and one or more software applications, instructions, programs, and/or data to implement the methods described herein and the functions attributed to the various systems. In various implementations, the memory 720 and 740 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some instances, aspects of some or all of the components discussed herein can include any models, algorithms, and/or machine learning algorithms. For example, in some instances, the components in the memory 720 and 740 can be implemented as a neural network.

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 7 may utilize the processes and flows of FIGS. 1-6.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A: A system comprising: one or more processors; and one or more non-transitory computer-readable media storing computer-executable instructions that, when executed, cause the one or more processors to perform operations comprising: receiving a first global navigation satellite system (GNSS) measurement associated with a first sensor at a first time; receiving a second GNSS measurement associated with the first sensor at a second time that is outside a threshold period of the first time; receiving a third GNSS measurement associated with a second sensor within the threshold period of the first time, wherein the first sensor and the second sensor are associated with a first vehicle; receiving odometry data associated with the first vehicle between the first time and the second time; determining a first movement pattern based at least in part on the first GNSS measurement and the second GNSS measurement; determining a second movement pattern based at least in part on the odometry data; determining a first value associated with the first movement pattern and the second movement pattern; determining a second value associated with a distance of the first GNSS measurement and the third GNSS measurement; determining first data representing that the first GNSS measurement is reliable based at least in part on the first value and the second value; determining a map of an environment based at least in part on the first data; and providing the map to a second system, wherein the second system is configured to control at least one of the first vehicle or a second vehicle based at least in part on the map.

B: The system of paragraph A, wherein determining the first data comprises: determining, based at least in part on the first value and the second value, a classification associated with the first GNSS measurement; determining a length associated with a first sequence of GNSS measurements that are associated with the classification, and wherein the first sequence comprises the first GNSS measurement; and determining the first data based at least in part on determining whether the length exceeds a threshold.

C: The system of paragraph A or B, wherein determining the first data comprises: performing a morphological operation based on the first data and second data representing that the second GNSS measurement is reliable.

D: The system of any of paragraphs A-C, wherein determining the map comprises: based at least in part on determining that the first GNSS measurement is reliable, determining a pose associated with a first node of a factor graph based at least in part on the first GNSS measurement; and performing a factor graph optimization based at least in part on the factor graph.

E: The system of any of paragraphs A-D, wherein determining the first data comprises: determining a threshold based at least in part on a first position associated with the first sensor, a second position associated with the second sensor, and a bias measure associated with the first sensor and the second sensor; and determining the first data based at least in part on whether the second value exceeds the threshold.

F: One or more non-transitory computer-readable media storing instructions executable by one or more processors, wherein the instructions, when executed, cause the one or more processors to perform operations comprising: receiving a first global navigation satellite system (GNSS) measurement associated with a first sensor at a first time, wherein the first sensor is associated with a first vehicle; receiving a second GNSS measurement associated with the first sensor at a second time that is outside a threshold period of the first time; receiving a third GNSS measurement associated with a second sensor at the threshold period of the first time, wherein the second sensor is associated with the first vehicle; receiving a travel distance between the first time and the second time; determining first data representing that the first GNSS measurement is reliable based at least in part on a first distance between the first GNSS measurement and the second GNSS measurement, the travel distance, and a deviation between the first GNSS measurement and the third GNSS measurement; and at least one of: determining a map based at least in part on the first data and providing the map to a system, wherein the system is configured to control at least one of the first vehicle or a second vehicle based at least in part on the map, or determining a pose associated with the first vehicle based at least in part on the first data and controlling the first vehicle based at least in part on the pose.

G: The one or more non-transitory computer-readable media of paragraph F, wherein determining the first data further comprises: determining the first data based at least in part on whether the deviation exceeds a threshold.

H: The one or more non-transitory computer-readable media of paragraph G, wherein determining the first data further comprises: determining the threshold based at least in part on a first position associated with the first sensor, a second position associated with the second sensor, and a bias measure associated with the first sensor and the second sensor.

I: The one or more non-transitory computer-readable media of any of paragraphs F-H, wherein determining the map comprises: based at least in part on determining that the first GNSS measurement is reliable, determining a pose associated with a first node of a factor graph based at least in part on the first GNSS measurement; and performing a factor graph optimization based at least in part on the factor graph.

J: The one or more non-transitory computer-readable media of paragraph I, wherein performing the factor graph optimization comprises: determining a weight associated with the first node based at least in part on determining that the first GNSS measurement is reliable; and performing the factor graph optimization based at least in part on the weight.

K: The one or more non-transitory computer-readable media of any of paragraphs F-J, wherein determining the first data comprises: determining a first sequence of GNSS measurements that have a same classification, wherein the same classification is one of a reliable classification or an unreliable classification, and wherein the first sequence comprises the first GNSS measurement; and determining the first data based at least in part on whether a length associated with the first sequence exceeds a threshold.

L: The one or more non-transitory computer-readable media of paragraph K, wherein the length is determined based at least in part on at least one of: a length of time associated with the first sequence, or a distance associated with the first sequence.

M: The one or more non-transitory computer-readable media of any of paragraphs F-L, wherein determining the first data comprises: determining a first sequence of GNSS measurements; and determining the first data based at least in part on performing a morphological operation on the first sequence.

N: A method comprising: receiving a first global navigation satellite system (GNSS) measurement associated with a first sensor at a first time, wherein the first sensor is associated with a first vehicle; receiving a second GNSS measurement associated with the first sensor at a second time that is outside a threshold period of the first time; receiving a third GNSS measurement associated with a second sensor at the threshold period of the first time, wherein the second sensor is associated with the first vehicle; receiving a travel distance between the first time and the second time; determining first data representing that the first GNSS measurement is reliable based at least in part on a first distance between the first GNSS measurement and the second GNSS measurement, the travel distance, and a deviation between the first GNSS measurement and the third GNSS measurement; and at least one of: determining a map based at least in part on the first data and providing the map to a system, wherein the system is configured to control at least one of the first vehicle or a second vehicle based at least in part on the map, or determining a pose associated with the first vehicle based at least in part on the first data and controlling the first vehicle based at least in part on the pose.

O: The method of paragraph N, wherein determining the first data further comprises: determining the first data based at least in part on whether the deviation exceeds a threshold.

P: The method of paragraph O, wherein determining the first data further comprises: determining the threshold based at least in part on a first position associated with the first sensor, a second position associated with the second sensor, and a bias measure associated with the first sensor and the second sensor.

Q: The method of any of paragraphs N-P, wherein determining the map comprises: based at least in part on determining that the first GNSS measurement is reliable, determining a pose associated with a first node of a factor graph based at least in part on the first GNSS measurement; and performing a factor graph optimization based at least in part on the factor graph.

R: The method of paragraph Q, wherein performing the factor graph optimization comprises: determining a weight associated with the first node based at least in part on determining that the first GNSS measurement is reliable; and performing the factor graph optimization based at least in part on the weight.

S: The method of any of paragraphs N-R, wherein determining the first data comprises: determining a first sequence of GNSS measurements that have a same classification, wherein the same classification is one of a reliable classification or an unreliable classification, and wherein the first sequence comprises the first GNSS measurement; and determining the first data based at least in part on whether a length associated with the first sequence exceeds a threshold.

T: The method of paragraph S, wherein the length is determined based at least in part on at least one of: a length of time associated with the first sequence, or a distance associated with the first sequence.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving a first global navigation satellite system (GNSS) measurement associated with a first sensor at a first time;

receiving a second GNSS measurement associated with the first sensor at a second time that is outside a threshold period of the first time;

receiving a third GNSS measurement associated with a second sensor within the threshold period of the first time, wherein the first sensor and the second sensor are associated with a first vehicle;

receiving odometry data associated with the first vehicle between the first time and the second time;

determining a first movement pattern based at least in part on the first GNSS measurement associated with the first sensor at the first time and the second GNSS measurement associated with the first sensor at the second time that is outside the threshold period of the first time;

determining a second movement pattern based at least in part on the odometry data;

determining a first value associated with the first movement pattern and the second movement pattern;

determining a second value associated with a distance of the first GNSS measurement associated with the first sensor at the first time and the third GNSS measurement associated with the second sensor within the threshold period of the first time;

determining first data representing that the first GNSS measurement associated with the first sensor at the first time is reliable based at least in part on the first value associated with the first movement pattern and the second movement pattern and the second value associated with the distance of the first GNSS measurement and the third GNSS measurement associated with the second sensor within the threshold period of the first time;

determining a map of an environment based at least in part on the first data; and providing the map to a second system, wherein the second system is configured to control at least one of the first vehicle or a second vehicle based at least in part on the map.

2. The system of claim 1, wherein determining the first data comprises:

determining, based at least in part on the first value and the second value, a classification associated with the first GNSS measurement associated with the first sensor at the first time;

determining a length associated with a first sequence of GNSS measurements that are associated with the classification, and wherein the first sequence of GNSS measurements comprises the first GNSS measurement associated with the first sensor at the first time; and determining the first data based at least in part on determining whether the length associated with the first sequence of GNSS measurements exceeds a threshold.

3. The system of claim 1, wherein determining the first data comprises:

performing a morphological operation based on the first data and second data representing that the second GNSS measurement associated with the first sensor at the second time that is outside the threshold period of the first time is reliable.

4. The system of claim 1, wherein determining the map comprises:

based at least in part on determining that the first GNSS measurement associated with the first sensor at the first time is reliable, determining a pose associated with a first node of a factor graph based at least in part on the first GNSS measurement associated with the first sensor at the first time; and performing a factor graph optimization based at least in part on the factor graph.

5. The system of claim 1, wherein determining the first data comprises:

determining a threshold based at least in part on a first position associated with the first sensor, a second position associated with the second sensor, and a bias measure associated with the first sensor and the second sensor; and determining the first data based at least in part on whether the second value exceeds the threshold.

6. One or more non-transitory computer-readable media storing instructions executable by one or more processors, wherein the instructions, when executed, cause the one or more processors to perform operations comprising:

receiving a first global navigation satellite system (GNSS) measurement associated with a first sensor at a first time, wherein the first sensor is associated with a first vehicle;

receiving a second GNSS measurement associated with the first sensor at a second time that is outside a threshold period of the first time;

receiving a third GNSS measurement associated with a second sensor at the threshold period of the first time, wherein the second sensor is associated with the first vehicle;

receiving a travel distance between the first time and the second time;

determining first data representing that the first GNSS measurement associated with the first sensor at the first time is reliable based at least in part on a first distance between the first GNSS measurement associated with the first sensor at the first time and the second GNSS measurement associated with the first sensor at the second time that is outside the threshold period of the first time, the travel distance, and a deviation between the first GNSS measurement associated with the first sensor at the first time and the third GNSS measurement associated with the second sensor at the threshold period of the first time; and at least one of:

determining a map based at least in part on the first data and providing the map to a system, wherein the system is configured to control at least one of the first vehicle or a second vehicle based at least in part on the map, or determining a pose associated with the first vehicle based at least in part on the first data and controlling the first vehicle based at least in part on the pose.

7. The one or more non-transitory computer-readable media of claim 6, wherein determining the first data further comprises:

determining the first data based at least in part on whether the deviation exceeds a threshold.

8. The one or more non-transitory computer-readable media of claim 7, wherein determining the first data further comprises:

determining the threshold based at least in part on a first position associated with the first sensor, a second position associated with the second sensor, and a bias measure associated with the first sensor and the second sensor.

9. The one or more non-transitory computer-readable media of claim 6, wherein determining the map comprises:

based at least in part on determining that the first GNSS measurement associated with the first sensor at the first time is reliable, determining a pose associated with a first node of a factor graph based at least in part on the first GNSS measurement associated with the first sensor at the first time; and performing a factor graph optimization based at least in part on the factor graph.

10. The one or more non-transitory computer-readable media of claim 9, wherein performing the factor graph optimization comprises:

determining a weight associated with the first node based at least in part on determining that the first GNSS measurement associated with the first sensor at the first time is reliable; and performing the factor graph optimization based at least in part on the weight.

11. The one or more non-transitory computer-readable media of claim 6, wherein determining the first data comprises:

determining a first sequence of GNSS measurements having a same classification, wherein the same classification is one of a reliable classification or an unreliable classification, and wherein the first sequence of GNSS measurements having the same classification comprises the first GNSS measurement associated with the first sensor at the first time; and determining the first data based at least in part on whether a length associated with the first sequence of GNSS measurements having the same classification exceeds a threshold.

12. The one or more non-transitory computer-readable media of claim 11, wherein the length associated with the first sequence of GNSS measurements having the same classification is determined based at least in part on at least one of:

a length of time associated with the first sequence of GNSS measurements having the same classification, or a distance associated with the first sequence of GNSS measurements having the same classification.

13. The one or more non-transitory computer-readable media of claim 6, wherein determining the first data comprises:

determining a first sequence of GNSS measurements; and determining the first data based at least in part on performing a morphological operation on the first sequence of GNSS measurements.

14. A method comprising:

receiving a first global navigation satellite system (GNSS) measurement associated with a first sensor at a first time, wherein the first sensor is associated with a first vehicle;

receiving a second GNSS measurement associated with the first sensor at a second time that is outside a threshold period of the first time;

receiving a third GNSS measurement associated with a second sensor at the threshold period of the first time, wherein the second sensor is associated with the first vehicle;

receiving a travel distance between the first time and the second time;

determining first data representing that the first GNSS measurement associated with the first sensor at the first time is reliable based at least in part on a first distance between the first GNSS measurement associated with the first sensor at the first time and the second GNSS measurement associated with the first sensor at the second time that is outside the threshold period of the first time, the travel distance, and a deviation between the first GNSS measurement associated with the first sensor at the first time and the third GNSS measurement associated with the second sensor at the threshold period of the first time; and at least one of:

determining a map based at least in part on the first data and providing the map to a system, wherein the system is configured to control at least one of the first vehicle or a second vehicle based at least in part on the map, or determining a pose associated with the first vehicle based at least in part on the first data and controlling the first vehicle based at least in part on the pose.

15. The method of claim 14, wherein determining the first data further comprises:

determining the first data based at least in part on whether the deviation exceeds a threshold.

16. The method of claim 15, wherein determining the first data further comprises:

determining the threshold based at least in part on a first position associated with the first sensor, a second position associated with the second sensor, and a bias measure associated with the first sensor and the second sensor.

17. The method of claim 14, wherein determining the map comprises:

based at least in part on determining that the first GNSS measurement associated with the first sensor at the first time is reliable, determining a pose associated with a first node of a factor graph based at least in part on the first GNSS measurement associated with the first sensor at the first time; and performing a factor graph optimization based at least in part on the factor graph.

18. The method of claim 17, wherein performing the factor graph optimization comprises:

determining a weight associated with the first node based at least in part on determining that the first GNSS measurement associated with the first sensor at the first time is reliable; and performing the factor graph optimization based at least in part on the weight.

19. The method of claim 14, wherein determining the first data comprises:

determining a first sequence of GNSS measurements having a same classification, wherein the same classification is one of a reliable classification or an unreliable classification, and wherein the first sequence of GNSS measurements having the same classification comprises the first GNSS measurement associated with the first sensor at the first time; and determining the first data based at least in part on whether a length associated with the first sequence of GNSS measurements having the same classification exceeds a threshold.

20. The method of claim 19, wherein the length associated with the first sequence of GNSS measurements having the same classification is determined based at least in part on at least one of:

a length of time associated with the first sequence of GNSS measurements having the same classification, or a distance associated with the first sequence of GNSS measurements having the same classification.

* * * * *